(12) United States Patent
Yoshioka et al.

(10) Patent No.: US 10,862,147 B2
(45) Date of Patent: Dec. 8, 2020

(54) FUEL CELL SYSTEM

(71) Applicant: AISAN KOGYO KABUSHIKI KAISHA, Obu (JP)

(72) Inventors: Mamoru Yoshioka, Nagoya (JP); Naruto Ito, Nisshin (JP); Makoto Fukui, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/539,025

(22) Filed: Aug. 13, 2019

(65) Prior Publication Data
US 2019/0372139 A1    Dec. 5, 2019

Related U.S. Application Data

(63) Continuation-in-part of application No. 15/692,881, filed on Aug. 31, 2017, now Pat. No. 10,601,058.

(30) Foreign Application Priority Data

Sep. 8, 2016    (JP) .................................. 2016-175750

(51) Int. Cl.
*H01M 8/04746*    (2016.01)
*H01M 8/04111*    (2016.01)
(Continued)

(52) U.S. Cl.
CPC ....... *H01M 8/04753* (2013.01); *F16K 1/2263* (2013.01); *H01M 8/04104* (2013.01);
(Continued)

(58) Field of Classification Search
CPC .. F16K 31/041; F16K 1/226; H01M 8/04664; H01M 8/04104
See application file for complete search history.

(56) References Cited

U.S. PATENT DOCUMENTS 4,729,930 A * 3/1988 Beal .................. H01M 8/04089
429/431
2002/0189584 A1    12/2002 Tanaka et al.
(Continued)

FOREIGN PATENT DOCUMENTS

JP    2002-371866 A    12/2002
JP    2005-147012 A    6/2005
(Continued)

OTHER PUBLICATIONS

Oct. 1, 2019 Office Action issued in Japanese Patent Application No. 2016-175750.
Nov. 15, 2019 Office Action issued in U.S. Appl. No. 15/692,881.

*Primary Examiner* — Maria Laios
(74) *Attorney, Agent, or Firm* — Oliff PLC

(57) ABSTRACT

In a fuel cell system, each of an inlet sealing valve and an outlet integration valve is provided with a valve seat including a valve hole and a seat surface formed on a circumferential edge of the valve hole, a valve element formed, on its outer periphery, with a seal surface corresponding to the seat surface, and a motor to move the valve element away from the valve seat upon receipt of electric power supplied from outside. The valve seat is provided with a seal member to seal between the valve element and the valve seat during non-operation of the motor. In an inlet-side bypass passage connected to an air supply passage by detouring around the inlet sealing valve, there are arranged an inlet-side bypass passage and an inlet bypass valve.

8 Claims, 25 Drawing Sheets

(51) Int. Cl.
*H01M 8/04302* (2016.01)
*H01M 8/04089* (2016.01)
*F16K 1/226* (2006.01)
*H01M 8/04664* (2016.01)
*F16K 31/04* (2006.01)

(52) U.S. Cl.
CPC .... *H01M 8/04111* (2013.01); *H01M 8/04302* (2016.02); *H01M 8/04664* (2013.01); *F16K 31/041* (2013.01); *H01M 2200/20* (2013.01); *H01M 2250/20* (2013.01)

(56) References Cited

U.S. PATENT DOCUMENTS

| | | |
|---|---|---|
| 2006/0000443 A1 | 1/2006 | Kado et al. |
| 2013/0202979 A1* | 8/2013 | Katano ............. H01M 8/04228 429/444 |
| 2016/0290513 A1* | 10/2016 | Asanuma ................ F16K 1/222 |

FOREIGN PATENT DOCUMENTS

| | | | |
|---|---|---|---|
| JP | 2006-046318 A | 2/2006 | |
| JP | 2008-34248 A | 2/2008 | |
| JP | 2010-192251 A | 9/2010 | |
| WO | 2015-098954 A1 | 7/2015 | |
| WO | WO-2015098954 A1 * | 7/2015 | ........... F02D 9/1025 |

* cited by examiner

FUEL CELL SYSTEM

CROSS-REFERENCE TO RELATED APPLICATIONS

This application is a Continuation-in-part application of U.S. patent application Ser. No. 15/692,881 filed on Aug. 31, 2017, which claims the benefit of priority from the prior Japanese Patent Application No. 2016-175750 filed on Sep. 8, 2016, the entire contents of which are incorporated herein by reference.

BACKGROUND

Technical Field

This disclosure relates to a fuel cell system provided with a fuel cell which generates electric power upon receipt of supply of fuel gas and oxidant gas and, more particularly, to a fuel cell system suitable to be mounted in fuel-cell vehicles.

Related Art

As one of conventional arts, there is a fuel cell system disclosed in Japanese unexamined patent application publication No. 2010-192251. This fuel cell system is provided with a fuel cell stack (fuel cells), a gas supply passage for supplying oxidant gas to the fuel cell stack, an upstream-side valve for controlling supply of the oxidant gas to the fuel cell stack, a compressor provided in the gas supply passage, a gas exhaust passage for exhausting the oxidant gas from the fuel cell stack, a downstream-side valve for controlling the exhaust of the oxidant gas from the fuel cell stack, a bypass passage for exhausting the oxidant gas to the gas exhaust passage by detouring around the fuel cell stack, and a bypass valve provided in the bypass passage and configured to regulate a flow rate of the oxidant gas to be allowed to flow in the bypass passage.

SUMMARY

Technical Problems

However, when the aforementioned fuel cell system uses for example a motor-driven opening/closing valve as the upstream-side valve, if a failure such as breaking of wire or disconnection occurs, the upstream-side valve could not be opened. If the failure such as breaking or disconnection comes about in the upstream-side valve during running of a fuel cell vehicle, it becomes impossible to supply oxidant gas to the fuel cell stack, resulting in a problem that the vehicle cannot perform escape running, or pull over.

Therefore, the present disclosure has been made to address the above problems and has a purpose to provide a fuel cell system capable of performing escape running even if an upstream-side valve fails to open by a failure such as breaking of wire.

Means of Solving the Problems

To achieve the above-mentioned purpose, one aspect of the present disclosure provides a fuel cell system comprising: a fuel cell; an oxidant gas supply passage for supplying oxidant gas to the fuel cell; a compressor provided in the oxidant gas supply passage and configured to supply the oxidant gas to the fuel cell; an upstream-side valve provided in the oxidant gas supply passage between the compressor and the fuel cell; an oxidant gas exhaust passage for exhausting the oxidant gas supplied to the fuel cell; a downstream-side valve provided in the oxidant gas exhaust passage; a bypass passage connected to the oxidant gas supply passage and the oxidant gas exhaust passage; a bypass valve provided in the bypass passage and configured to control a flow rate of the oxidant gas to be allowed to flow in the bypass passage; and a controller configured to execute various controls, wherein each of the upstream-side valve and the downstream-side valve includes: a valve seat including a valve hole and a seat surface formed at an edge of the valve hole; a valve element including an outer periphery formed with a seal surface corresponding to the seat surface; and a drive mechanism configured to move the valve element in a direction away from the valve seat by electric power supplied from outside, one of the valve seat and the valve element is provided with a seal member configured to seal between the valve element and the valve seat during non-operation of the drive mechanism, and the fuel cell system further includes: an upstream-side bypass passage connected to the oxidant gas supply passage by detouring around the upstream-side valve; and an upstream-side bypass valve in the upstream-side bypass passage.

In this fuel cell system, the upstream-side bypass passage is provided in connection with the oxidant gas supply passage by detouring around the upstream-side valve, and the upstream-side bypass valve is placed in the upstream-side bypass passage. Thus, even if the upstream-side valve fails to open by failure such as breaking of wire or disconnection, the upstream-side bypass valve can be opened, allowing supply of oxidant gas to a fuel cell. Accordingly, even if the upstream-side valve fails to open, a vehicle is allowed to perform escape running. As the upstream-side bypass valve, for example, a solenoid valve or a relief valve may be used. In the case of using the relief valve, this relief valve is configured to open when the pressure in the upstream-side bypass passage reaches a predetermined pressure.

The fuel cell system according to the present disclosure enables a vehicle to perform escape running even if an upstream-side valve fails to open by a failure such as breaking of wire.

DETAILED DESCRIPTION OF THE EXEMPLARY EMBODIMENTS

A detailed description of an embodiment of a fuel cell system which is one of typical embodiments of this disclosure will now be given referring to the accompanying drawings. In the present embodiment described below, the fuel cell system of the present disclosure is applied to a fuel cell system to be mounted in a fuel cell vehicle to supply electric power to a driving motor (not shown).

First Embodiment

Figure 1:
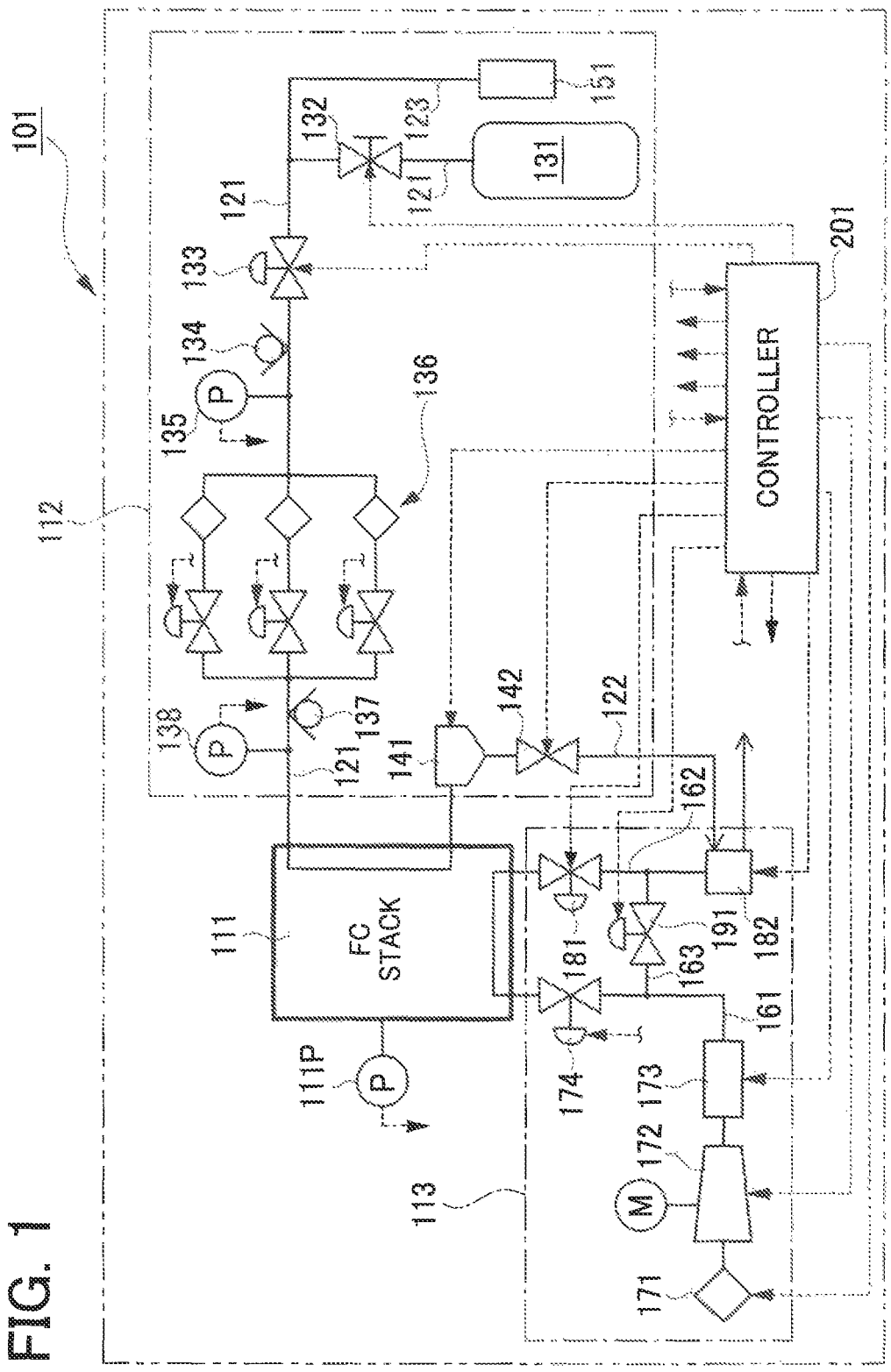
FIG. 1 is a schematic configuration view of a fuel cell system in an embodiment.

Firstly, a first embodiment will be described below. As shown in FIG. 1, a fuel cell system 101 in the present embodiment includes a fuel cell stack (fuel cells) 111, a hydrogen system 112, and an air system 113.

The fuel cell stack 111 generates electricity upon receipt of supply of fuel gas and supply of oxidant gas. In the present embodiment, the fuel gas is hydrogen gas and the oxidant gas is air. Specifically, the fuel cell stack 111 is configured to produce electric power upon receipt of hydrogen gas supplied from the hydrogen system 112 and air supplied from the air system 113. The electric power generated in the fuel cell stack 111 will be supplied to a drive motor (not shown) through an inverter (not shown). Further, the fuel cell stack 111 is provided with a stack pressure sensor 111P for detecting the pressure in the fuel cell stack 111 (i.e. stack pressure).

The hydrogen system 112 is provided on an anode side of the fuel cell stack 111. This hydrogen system 112 is provided with a hydrogen supply passage 121, a hydrogen exhaust passage 122, and a filling passage 123. The hydrogen supply passage 121 is a flow passage to supply hydrogen gas from a hydrogen tank 131 to the fuel cell stack 111. The hydrogen exhaust passage 122 is a flow passage to exhaust hydrogen gas discharged out of the fuel cell stack 111 (hereinafter, appropriately referred to as "hydrogen offgas"). The filling passage 123 is a flow passage to fill hydrogen gas into the hydrogen tank 131 through a fill port 151.

The hydrogen system 112 includes, on the hydrogen supply passage 121, a main stop valve 132, a high-pressure regulator 133, a medium-pressure relief valve 134, a pressure sensor 135, an injector part 136, a low-pressure relief valve 137, and a pressure sensor 138, which are arranged from a side close to the hydrogen tank 131. The main stop valve 132 is a valve for switching supply and shutoff of hydrogen gas from the hydrogen tank 131 to the hydrogen supply passage 121. The high-pressure regulator 133 is a pressure regulating valve to reduce the pressure of hydrogen gas. The medium-pressure relief valve 134 is a valve configured to open when the pressure between the high-pressure regulator 133 and the injector part 136 becomes a predetermined pressure or higher in order to regulate the pressure to below the predetermined pressure. The pressure sensor 135 is a sensor to detect the pressure in the hydrogen supply passage 121 between the high-pressure regulator 133 and the injector part 136. The injector part 136 is a mechanism for regulating a flow rate of hydrogen gas. The low-pressure relief valve 137 is a valve configured to open when the pressure in the hydrogen supply passage 121 between the injector part 136 and the fuel cell stack 111 becomes a predetermined pressure or higher in order to regulate the pressure to below the predetermined pressure. The pressure sensor 138 is a sensor to detect the pressure in the hydrogen supply passage 121 between the injector part 136 and the fuel cell stack 111.

The hydrogen system 112 further includes, on the hydrogen exhaust passage 122, a gas-liquid separator 141 and an exhaust-drain valve 142 arranged in this order from a side close to the fuel cell stack 111. The gas-liquid separator 141 is a device to separate moisture from the hydrogen offgas. The exhaust-drain valve 142 is a valve to switch exhaust and shutoff of hydrogen offgas and moisture from the gas-liquid separator 141 to a diluter 182 of the air system 113.

The air system 113 is provided on a cathode side of the fuel cell stack 111. This air system 113 is provided with an air supply passage 161, an air exhaust passage 162, and a bypass passage 163. The air supply passage 161 is a flow passage to supply air from the outside of the fuel cell system 101 into the fuel cell stack 111. The air exhaust passage 162 is a flow passage to exhaust air discharged out of the fuel cell stack 111 (hereinafter, appropriately referred to as "air offgas"). The bypass passage 163 is a flow passage to allow air to flow from the air supply passage 161 to the air exhaust passage 162 without passing through the fuel cell stack 111.

The air system 113 further includes an air cleaner 171, a compressor 172, an intercooler 173, and an inlet sealing valve (an upstream-side valve) 174, which are arranged in this order along the air supply passage 161. The air cleaner 171 is a device to clean up air externally taken in the fuel cell system 101. The compressor 172 is a device to supply air to the fuel cell stack 111. The intercooler 173 is a device to cool air. The inlet sealing valve 174 is a sealing valve to switch supply and shutoff of air flow to the fuel cell stack 111. The inlet sealing valve 174 in the present embodiment is an eccentric valve in which a seal surface of a valve element is placed eccentrically from a rotary shaft. The details of the inlet sealing valve 174 will be described later.

The air system 113 further includes, on the air exhaust passage 162, an outlet integration valve (a downstream-side valve) 181 and a diluter 182 arranged in this order from a side close to the fuel cell stack 111.

The outlet integration valve 181 is a valve (a valve having a function of pressure regulation (flow control)) to regulate the back pressure of the fuel cell stack 111 to thereby control an exhaust amount of air offgas from the fuel cell stack 111. The outlet integration valve 181 in the present embodiment is an eccentric valve substantially identical in structure to the inlet sealing valve 174 (except for a case where a rubber seat 21 is different in structure from that in the inlet sealing valve 174). The details of this outlet integration valve 181 will be described later.

The diluter 182 is a device to dilute hydrogen offgas exhausted from the hydrogen exhaust passage 122 by the air offgas and the air flowing through the bypass passage 163.

The air system 113 further includes a bypass valve 191 on the bypass passage 163. The bypass valve 191 is a valve to control a flow rate of air in the bypass passage 163. The bypass valve 191 in the present embodiment is an eccentric valve substantially identical in structure (excepting the absence of the rubber seat 21) to the inlet sealing valve 174 and the outlet integration valve 181. This bypass valve 191 will be described in detail later.

The fuel cell system 101 is further provided with a controller (a control unit) 201 to control the system. Specifically, the controller 201 is configured to control each part or device of the fuel cell system 101 and perform various determinations. In addition, the fuel cell system 101 also includes a cooling system (not shown) to cool the fuel cell stack 111.

In the fuel cell system 101 configured as above, the hydrogen gas supplied from the hydrogen supply passage 121 to the fuel cell stack 111 is consumed in the fuel cell stack 111 to generate electric power and thereafter is exhausted as hydrogen offgas from the fuel cell stack 111 to the outside of the fuel cell system 101 through the hydrogen exhaust passage 122 and the diluter 182. The air supplied from the air supply passage 161 to the fuel cell stack 111 is consumed in the fuel cell stack 111 to generate electric power and then is exhausted as air offgas from the fuel cell stack 111 to the outside of the fuel cell system 101 through the air exhaust passage 162 and the diluter 182.

Herein, the inlet sealing valve 174, the outlet integration valve 181, and the bypass valve 191 will be described below with reference to FIGS. 2 to 10. Those valves are basically identical in structure excepting that the inlet sealing valve 174 and the outlet integration valve 181 may be different in structure of a rubber seat and that the bypass valve 191 includes no rubber seat. Thus, the following explanation will be given with a focus on the inlet sealing valve 174, and explanations of the outlet integration valve 181 and the bypass valve 191 are appropriately added.

Figure 2:
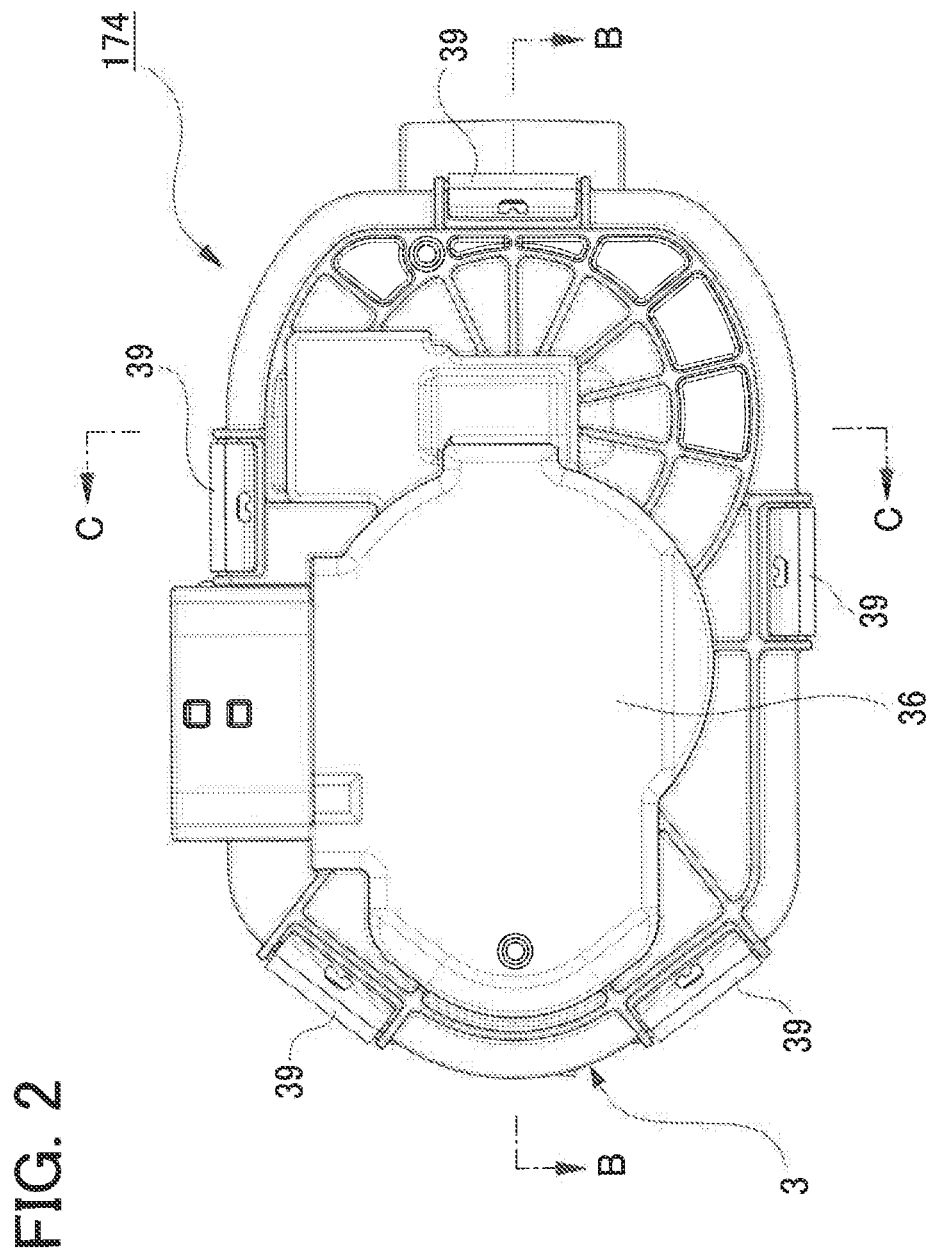
FIG. 2 is a front view of an inlet sealing valve.
Figure 3:
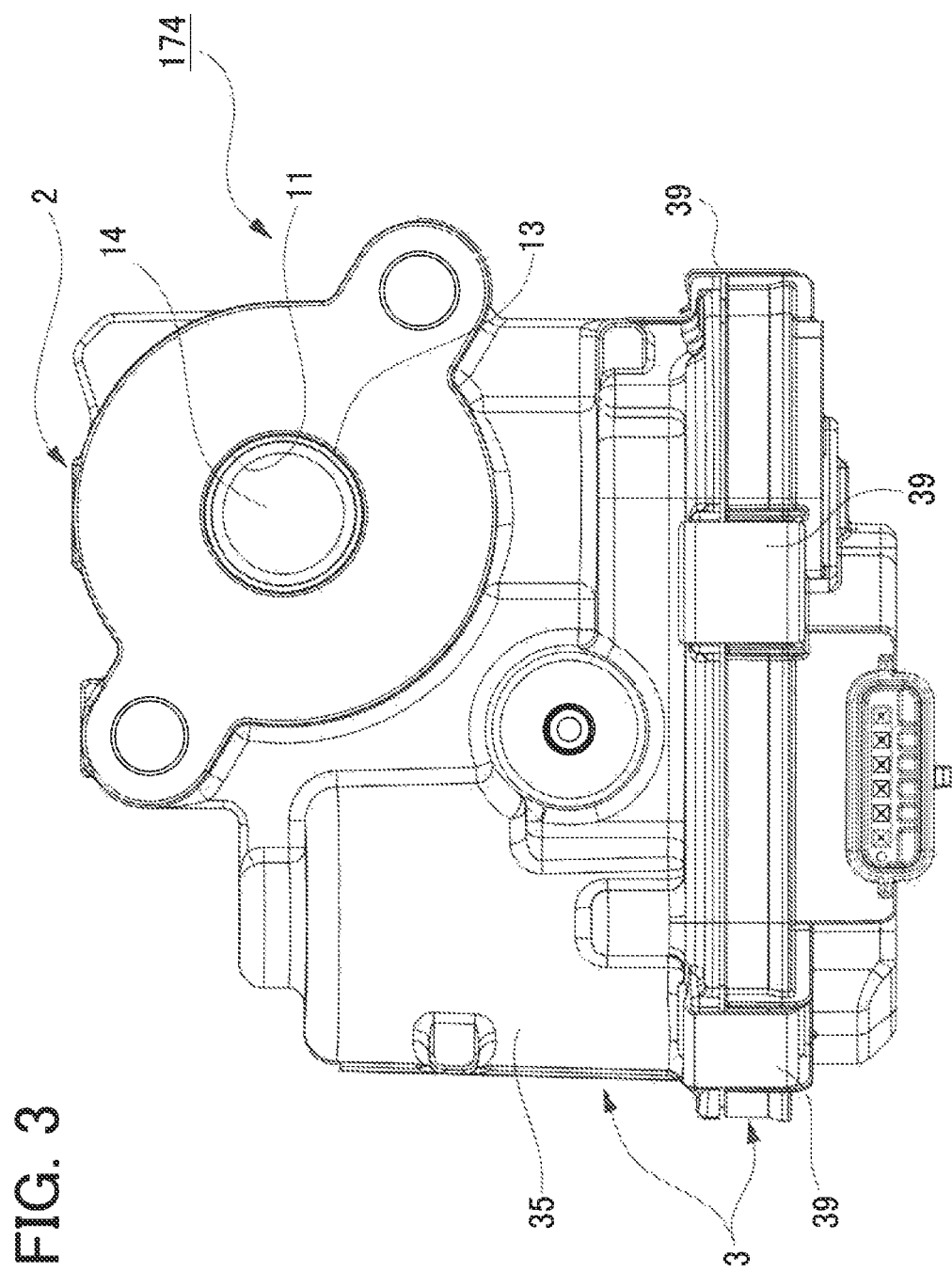
FIG. 3 is a plan view of the inlet sealing valve.

As shown in FIGS. 2 and 3, the inlet sealing valve 174 is provided with a valve section 2 and a drive mechanism section 3. The valve section 2 includes a pipe part 12 (see FIG. 8) having a passage 11 for allowing air (atmospheric air) to flow. In this passage 11, there are placed a valve seat 13, a valve element 14, and a rotary shaft 15. The rotary shaft 15 receives driving force (torque) transmitted from the drive mechanism section 3. This drive mechanism section 3 includes a motor 32 and a speed-reducing mechanism 33 (see FIGS. 8 and 9).

Figure 4:
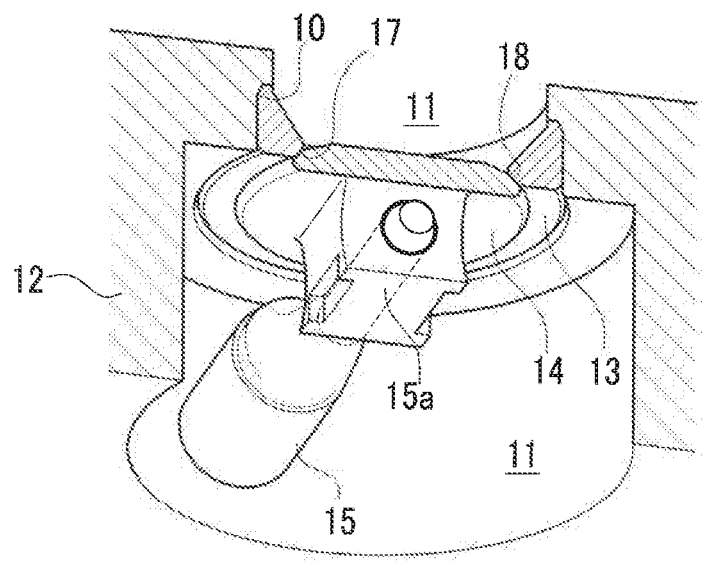
FIG. 4 is a partially-cutaway perspective view of a valve section in a valve-closed state (a fully-closed state) in which a valve element is in contact with a valve seat.
Figure 5:
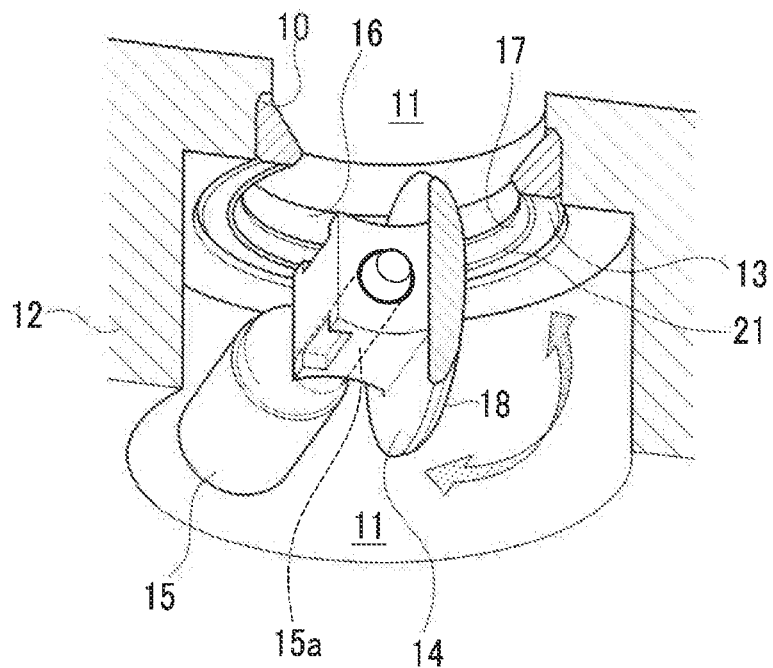
FIG. 5 is a partially-cutaway perspective view of the valve section in a fully-open state in which the valve element is most away from the valve seat.

As shown in FIGS. 4 and 5, the passage 11 is formed with a recessed shoulder 10 in which the valve seat 13 is fitted. The valve seat 13 has a circular ring shape formed with a valve hole 16 at the center. The valve hole 16 is formed, on its circumferential edge, with an annular seat surface 17. The valve element 14 includes a circular disc-shaped portion whose outer periphery has an annular seal surface 18 corresponding to, that is, to be brought in contact with, the seat surface 17. The valve element 14 is integrally provided with the rotary shaft 15 and rotatable together with the rotary shaft 15.

Figure 10:
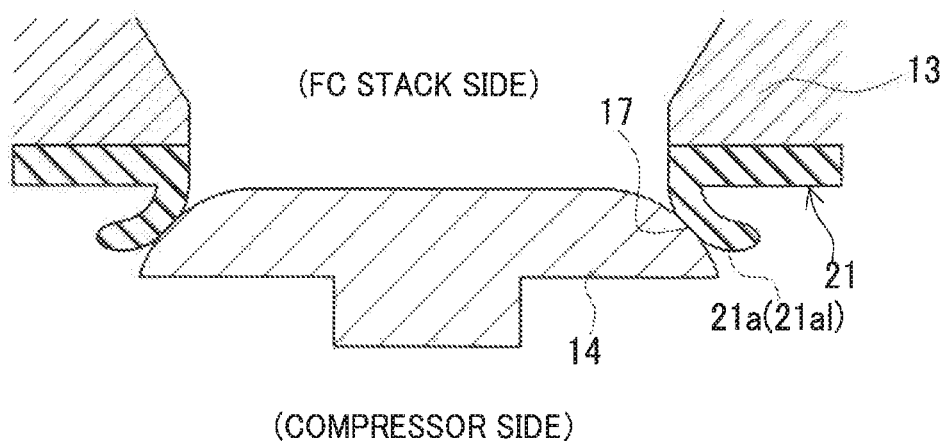
FIG. 10 is a cross-sectional view of a rubber seat.

In the present embodiment, the valve seat 13 is provided with a rubber seat (a seal member) 21 (see FIG. 10). The seat surface 17 is formed in this rubber seat 21. The details of the rubber seat 21 will be described later. In the bypass valve 191 that is not provided with the rubber seat 21, the seat surface 17 is formed in the valve seat 13.

In the present embodiment, referring to FIGS. 4 and 5, the inlet sealing valve 174 is configured such that the passage 11 formed on an opposite side (i.e., an upper side in the figures) to the valve element 14 and the rotary shaft 15 with respect to the valve seat 13 is located on a side close to the fuel cell stack 111 (on a downstream side of air flow), while the passage 11 formed on a side (i.e., a lower side in the figures) close to the valve element 14 and the rotary shaft 15 with respect to the valve seat 13 is located on a side close to a compressor (on an upstream side of air flow). In other words, in the present embodiment, the air will flow in the passage 11 from the valve element 14 (the rotary shaft 15) side toward the valve seat 13 side.

In the outlet integration valve 181, reversely from the inlet sealing valve 174, the passage 11 formed on the opposite side to the valve element 14 and the rotary shaft 15 with respect to the valve seat 13 is located on the side close to the fuel cell stack 111 (on an upstream side of air flow), while the passage 11 formed on the close to the valve element 14 and the rotary shaft 15 with respect to the valve seat 13 is located on a side close to the diluter 182 (on a downstream side of air flow). In other words, in the outlet integration valve 181, the air will flow in the passage 11 from the valve seat 13 side toward the valve element 14 (the rotary shaft 15) side.

In the bypass valve 191, furthermore, the passage 11 formed on the opposite side to the valve element 14 and the rotary shaft 15 with respect to the valve seat 13 is located on a side close to the air exhaust passage 162 (on a downstream side of air flow), while the passage 11 formed on the side close to the valve element 14 and the rotary shaft 15 with respect to the valve seat 13 is located on a side close to the air supply passage 161 (on an upstream side of air flow). In other words, in the bypass valve 191, the air will flow in the passage 11 from the valve element 14 (the rotary shaft 15) side toward the valve 13 side.

Figure 6:
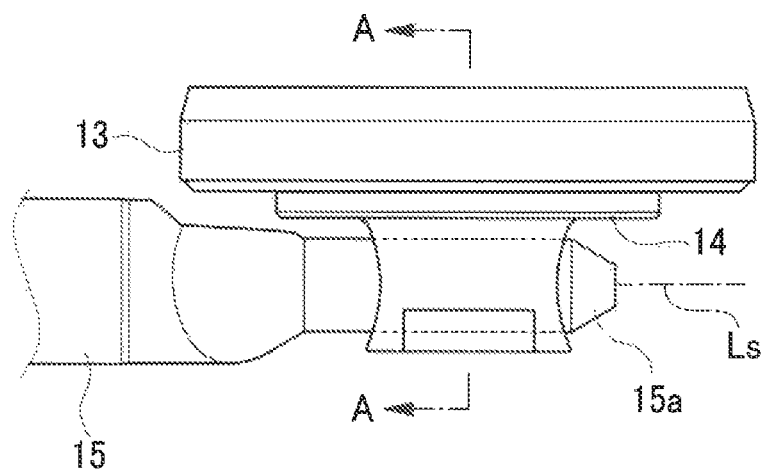
FIG. 6 is a side view of the valve seat, the valve element, and a rotary shaft in the inlet sealing valve in a valve-closed state.
Figure 7:
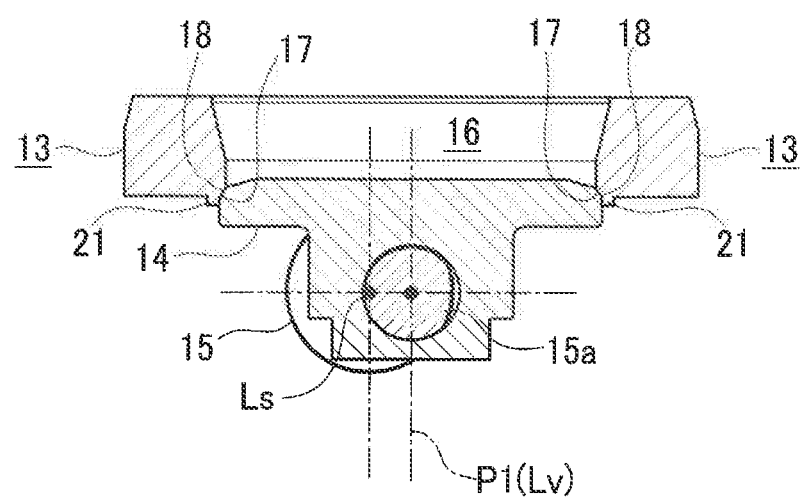
FIG. 7 is a cross sectional view taken along a line A-A in FIG. 6.

As shown in FIGS. 6 and 7, the central axis Ls of the rotary shaft 15 extends in parallel to the diameter of the valve element 14 (more concretely, the diameter of the disc-shaped portion of the valve element 14) and is positioned eccentrically from the central axis P1 of the valve hole 16 to one side in a radial direction of the valve hole 16. The seal surface 18 of the valve element 14 is positioned eccentrically from the central axis Ls of the rotary shaft 15 to an extending direction of the central axis Lv of the valve element 14.

By rotation of the valve element 14 about the central axis Ls of the rotary shaft 15, the valve element 14 is movable between a valve-closing position in which the seal surface 18 of the valve element 14 is in surface contact with the seat surface 17 (see FIG. 4) and a fully-open position in which the seal surface 18 is most away from the seat surface 17 (see FIG. 5).

Figure 8:
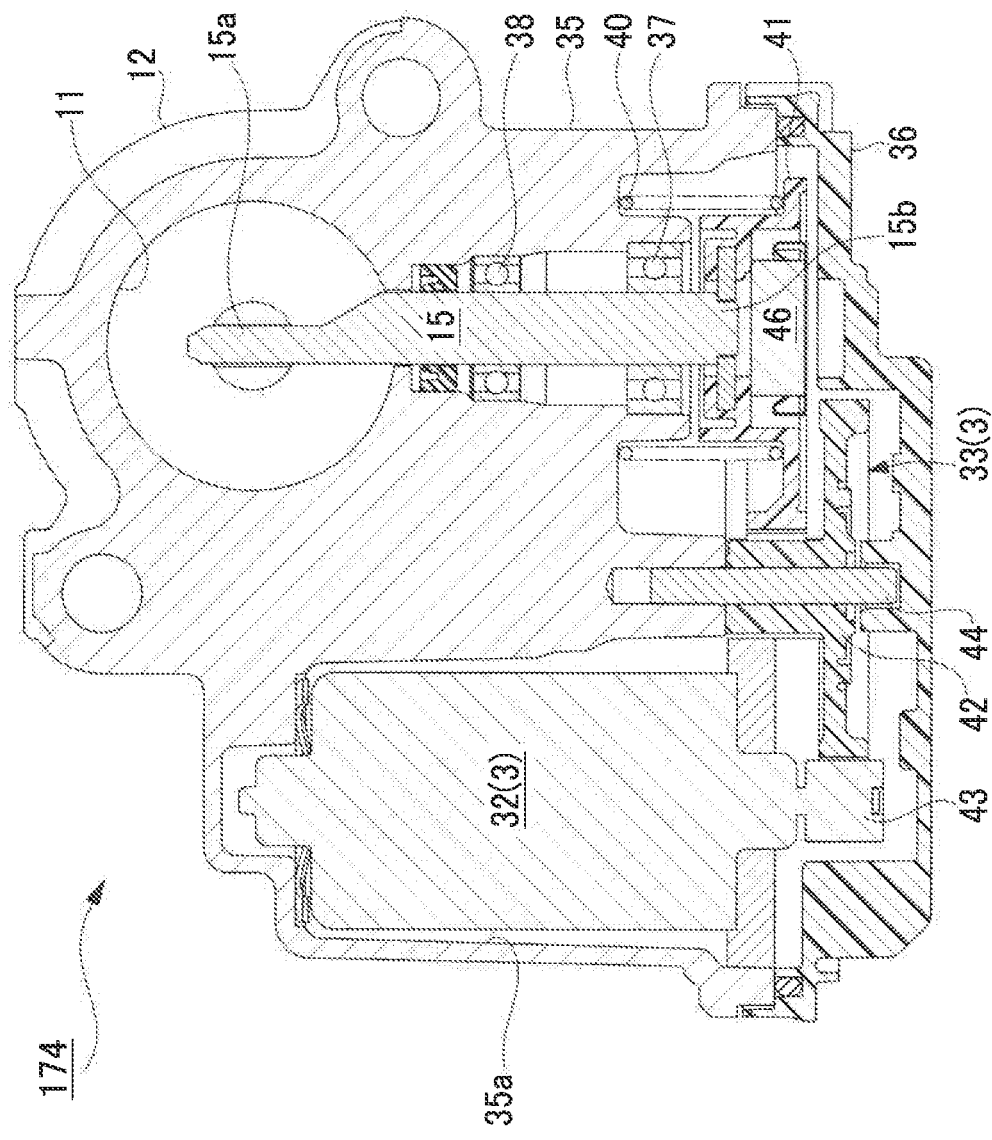
FIG. 8 is a cross sectional view taken along a line B-B in FIG. 2.
Figure 9:
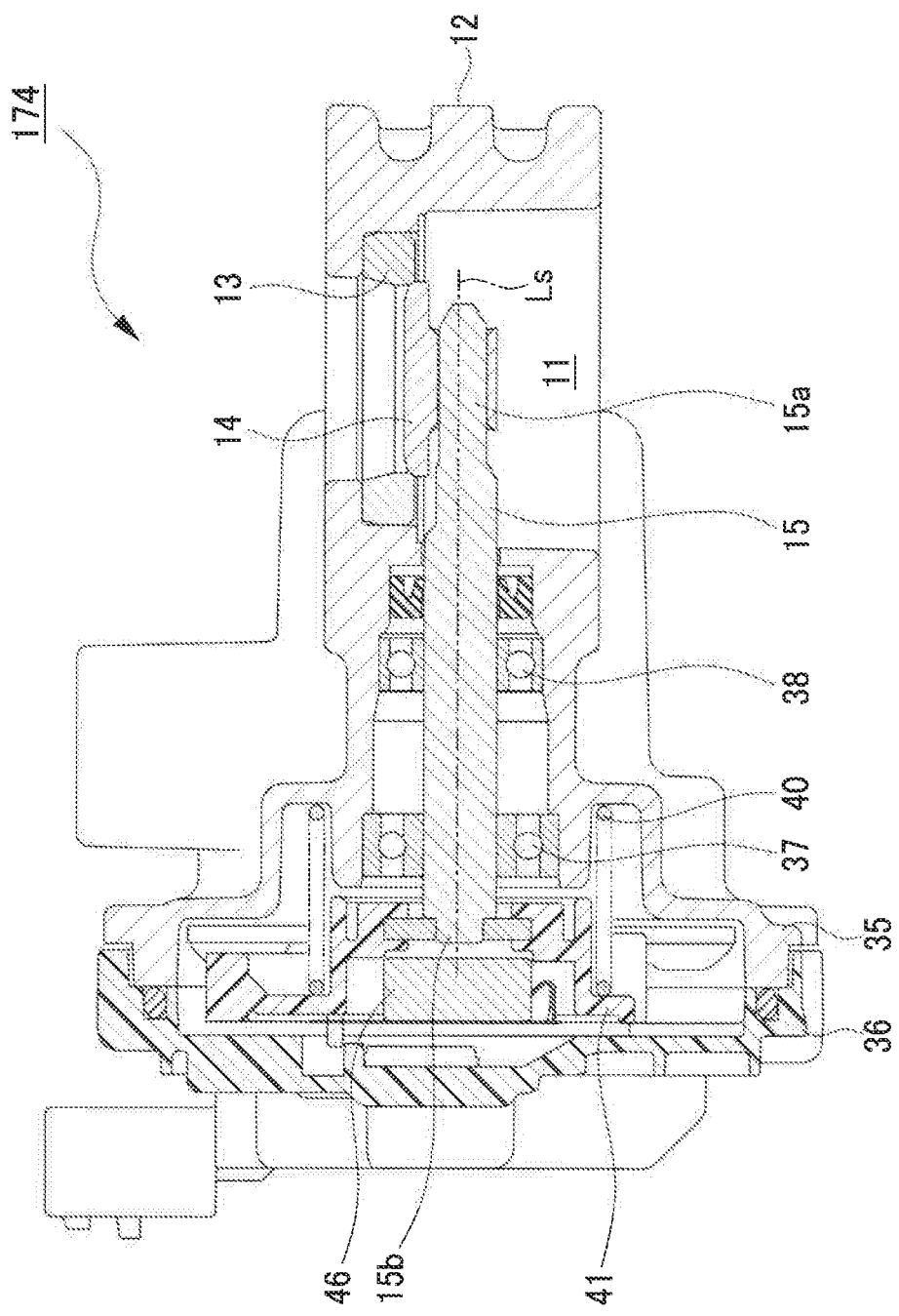
FIG. 9 is a cross sectional view taken along a line C-C in FIG. 2.

As shown in FIGS. 8 and 9, a valve housing 35 made of either metal or synthetic resin is provided with the pipe past 12 formed with the passage 11 and a holding cavity 35a for accommodating the motor 32. An end frame 36 made of either meal of synthetic resin closes an open end of the valve housing 35. The valve element 14 and the rotary shaft 15 are placed in the valve housing 35. The rotary shaft 15 includes a pin 15a in its distal end portion. Specifically, the pin 15a is provided at one end of the rotary shaft 15 in a direction of the central axis Ls (on the side close to the valve element 14). At the other end of the rotary shaft 15 in the direction of the central axis Ls (on the side close to a main gear 41), there is provided with a proximal end portion 15b.

The distal end portion of the rotary shaft 15 formed with the pin 15a is a free distal end which is inserted and placed in the passage 11 of the pipe part 12. The rotary shaft 15 is supported in cantilever configuration through two bearings arranged apart from each other, that is, a first bearing 37 and a second bearing 38, so that the rotary shaft 15 is rotatable with respect to the valve housing 35. The first bearing 37 and the second bearing 38 are each constituted of a ball bearing. Those first and second bearings 37 and 38 are placed between the valve element 14 and the main gear 41 in the direction of the central axis Ls of the rotary shaft 15 to rotatably support the rotary shaft 15. In the present embodiment, the first bearing 37 is located at a position on a side close to the main gear 41 relative to the second bearing 38. The valve element 14 is fixed by welding to the pin 15a in the distal end portion of the rotary shaft 15 and is placed in the passage 11.

The end frame 36 is secured to the valve housing 35 with a plurality of clips 39 (see FIGS. 2 and 3). As shown in FIGS. 8 and 9, the main gear 41 provided with a fan-shaped gear is fixed to the proximal end portion 15b of the rotary shaft 15. The return spring 40 is provided between the valve housing 35 and the main gear 41.

As shown in FIG. 8, the motor 32 is accommodated and fixed in the holding cavity 35a of the valve housing 35. The motor 32 is operative to generate driving force to rotate the rotary shaft 15 in a valve opening direction and a valve closing direction. The motor 32 is coupled to the rotary shaft 15 to transmit the driving force through the speed reducing mechanism 33 in order to open and close the valve element 14. Specifically, a motor gear 43 is fixed to an output shaft of the motor 32. This motor gear 43 is connected to the main gear 41 through an intermediate gear 42. The motor 32 generates driving force to rotate the rotary shaft 15 in the valve opening direction and the valve closing direction.

The intermediate gear 42 is a double gear rotatably supported by the valve housing 35 through a pin shaft 44. The intermediate gear 42 is drivingly engaged with the motor gear 43 and the main gear 41. In the present embodiment, the main gear 41, the intermediate gear 42, and the motor gear 43 are each made of resin for weight reduction.

The motor 32 is one example of a "drive mechanism" in the present disclosure. The intermediate gear 42 (a drive transmission part) transmits the driving force of the motor 32 to the rotary shaft 15.

In the inlet sealing valve 174 configured as above, when the motor 32 is energized from a state that the valve element 14 is held in a fully-closed state as shown in FIG. 4, the motor driving force is exerted on the motor gear 43 in a forward direction (i.e., a direction to open the valve element 14) and this rotation is reduced in speed through the intermediate gear 42 and then transmitted to the main gear 41. Then, the rotary shaft 15 fixed to the main gear 41 is rotated about the central axis Ls against the spring force generated by the return spring 40 to urge the valve element 14 in the valve closing direction. The rotation of the rotary shaft 15 causes the valve element 14 to rotate as indicated by an arrow in FIG. 5, thus opening the passage 11. Thereafter, when the drive voltage applied to the motor 32 is maintained at a constant level in the process of opening the valve element 14, the motor driving force and the return spring force become balanced with each other at the rotated position of the valve element 14 at that time, so that the valve element 14 is held at a predetermined opening degree.

Figure 11:
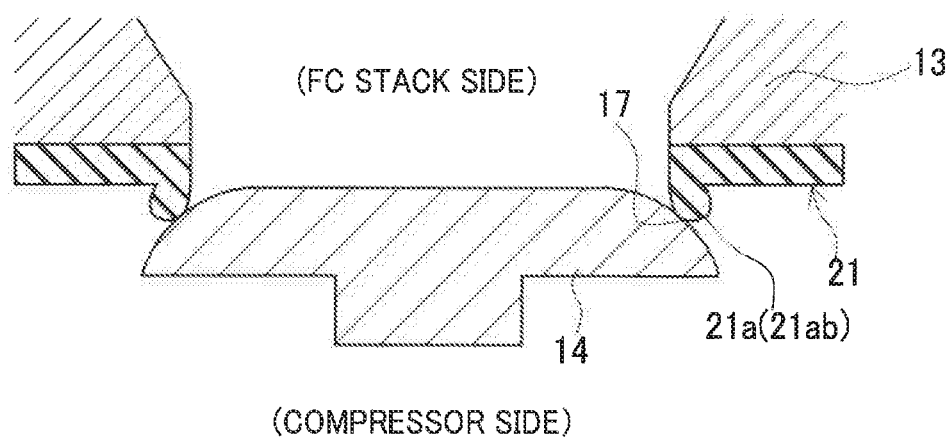
FIG. 11 is a cross-sectional view of another rubber seat.

Herein, in the inlet sealing valve 174, during full closing, the valve element 14 is in contact with the rubber seat (a seal member) 21 provided in the valve seat 13. More concretely, as shown in FIG. 10 or FIG. 11, the valve element 14 is in contact with a seal part 21a provided in the rubber seat 21. At that time, the valve element 14 is in contact with the entire circumference of the seat surface 17 of the seal part 21a. The seal part 21a is configured to be bendable when pressed by the valve element 14. In the present embodiment, at that time, the seal part 21a of the rubber seat 21 is pressed and deformed by the valve element 14. However, this seal part 21a is deformed within an elastic deformation region, but is not plastically deformed.

The seal part 21a has such a shape as to increase the surface pressure of a portion in contact with the seal surface 18 of the valve element 14 under negative pressure generated in the fuel cell stack 111 (i.e., stack negative pressure: up to about −60 kPa) during full closing (during non-operation of the motor 32). For instance, the seal part 21a may be selected from a lip seal part 21a1 having a lip-like shape (FIG. 10), a bead seal part 21ab having a bead-like shape (FIG. 11), or others. In this way, the rubber seat 21 closes (seals) between the valve seat 13 and the valve element 14. Thus, the inlet sealing valve 174 achieves enhanced sealing performance with a simple structure. Accordingly, when supply of air to the fuel cell stack 111 to be stopped, the inlet sealing valve 174 is fully closed, thereby allowing sealing of the air on an inlet side of the fuel cell stack 111.

The outlet integration valve 181 is also configured as above. The seal part 21a in the outlet integration valve 181 is the lip seal part 21a1 (FIG. 10). The bypass valve 191 is also configured as above except for the absence of the rubber seat 21. In the air system 113, as described above, the eccentric valves basically identical in structure are used for the inlet sealing valve 174, the outlet integration valve 181, and the bypass valve 191 as shown in FIG. 1 to allow commonality of valves in the air system 113, except that the inlet sealing valve 174 and the outlet integration valve 181 are different in structure of the rubber seat and the bypass valve 191 includes no rubber seat.

Figure 12:
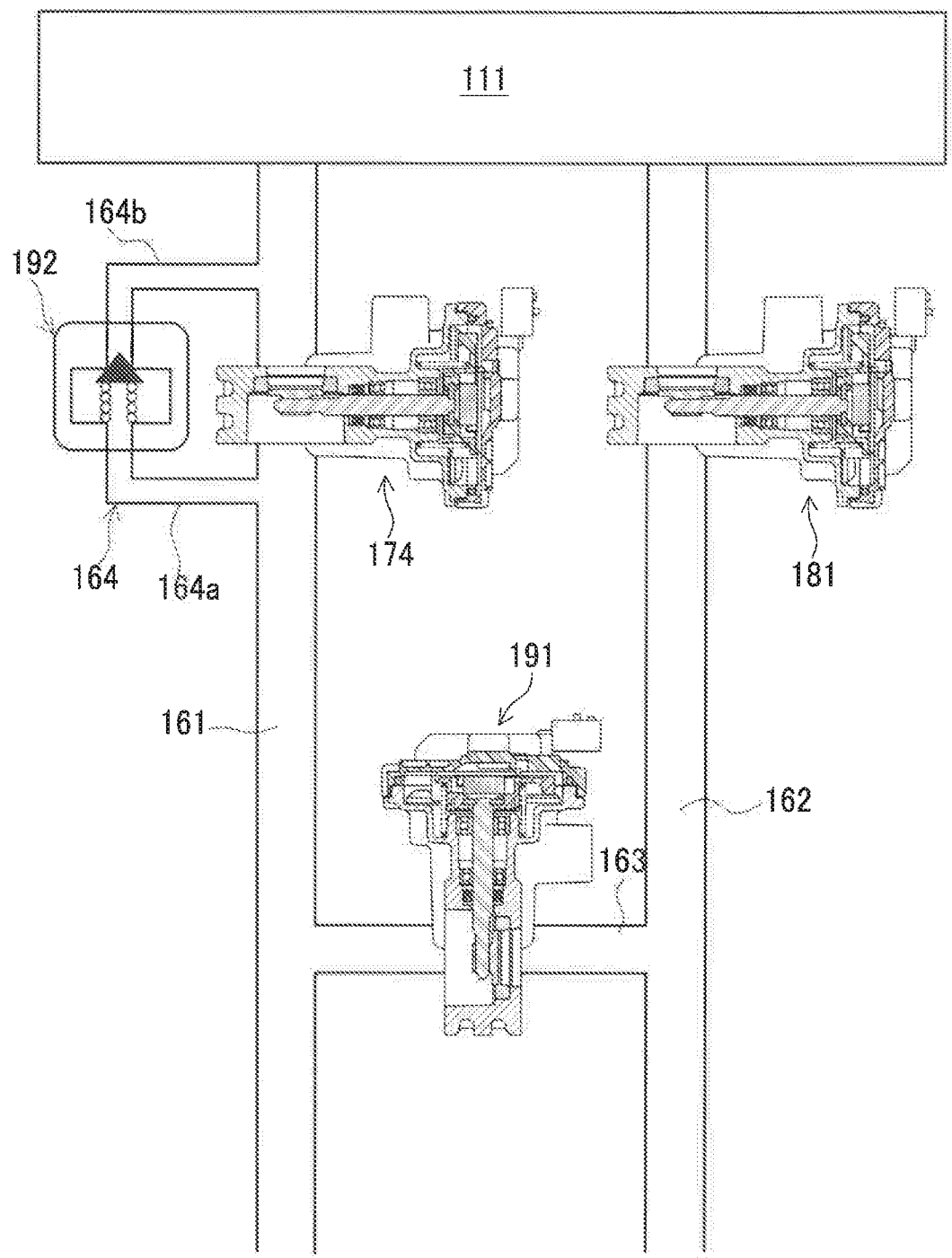
FIG. 12 is a schematic configuration view of an air system in a first embodiment.

Furthermore, the air system 113 is provided with an inlet-side bypass passage 164 connected to an air supply passage 161 by detouring around the inlet sealing valve 174 as shown in FIG. 12. The inlet-side bypass passage 164 is provided with an inflow pipe 164a and an outflow pipe 164b. The inlet-side bypass passage 164 is one example of an upstream-side bypass passage in the present disclosure.

In this inlet-side bypass passage 164, an inlet bypass valve 192 is placed. In the present embodiment, the inlet bypass valve 192 is a solenoid valve configured to open and close in response to a command signal from the controller 201. The inlet bypass valve 192 is one example of an upstream-side bypass valve of the present disclosure. When this inlet bypass valve 192 is opened, air is supplied to the fuel cell stack 111 through the inflow pipe 164a of the inlet-side bypass passage 164, the inlet bypass valve 192, and the outflow pipe 164b of the inlet-side bypass passage 164. If the inlet sealing valve 174 is in closing failure (i.e., the inlet sealing valve 174 fails in a closed position) because of breaking of wire or other causes, the fuel cell stack 111 can be supplied with air through the inlet-side bypass passage 164.

Figure 13:
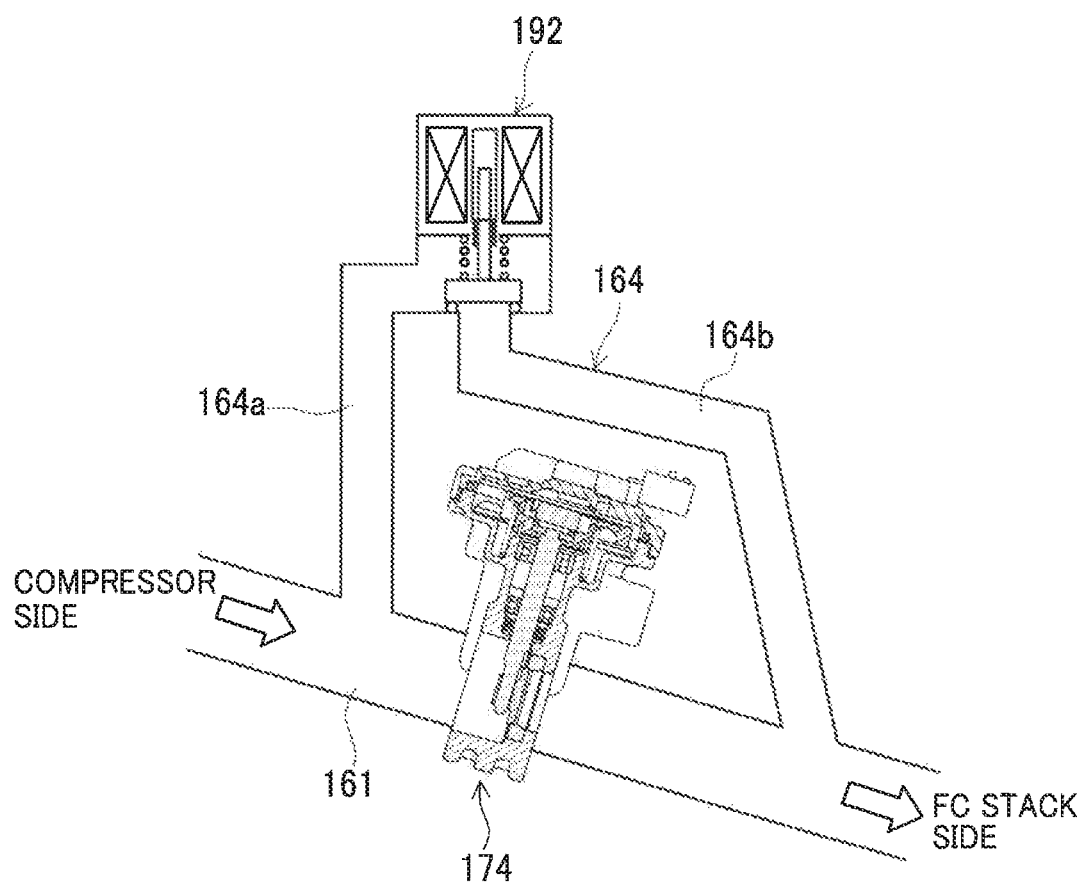
FIG. 13 is a view showing placement (mounting state) and structure of an inlet bypass valve.

Herein, the inlet bypass valve 192 is a normally-closed solenoid valve and configured to open by moving a movable iron core in a direction toward a fixed iron core during energization as shown in FIG. 13. The inlet bypass valve (solenoid valve) 192 is positioned so that the negative pressure (stack negative pressure) generated in the fuel cell stack 111 acts in the valve closing direction and also the air pressure (compressor pressure) increased in the inflow pipe 164a of the inlet-side bypass passage 164 by operation of the compressor 172 acts in the valve closing direction. Further, the inlet bypass valve 192 is placed in a higher position than the fuel cell stack 111 to avoid accumulation of by-product water in the outflow pipe 164b of the inlet-side bypass passage 164, that is, to allow the by-product water to flow to the fuel cell stack 111.

In the fuel cell system 101, if the inlet sealing valve 174 fails to open due to closing failure, the following control (Air supply control during failure) is executed to supply air to the fuel cell stack 111 to enable a vehicle to perform escape running, or pull over.

Figure 14:
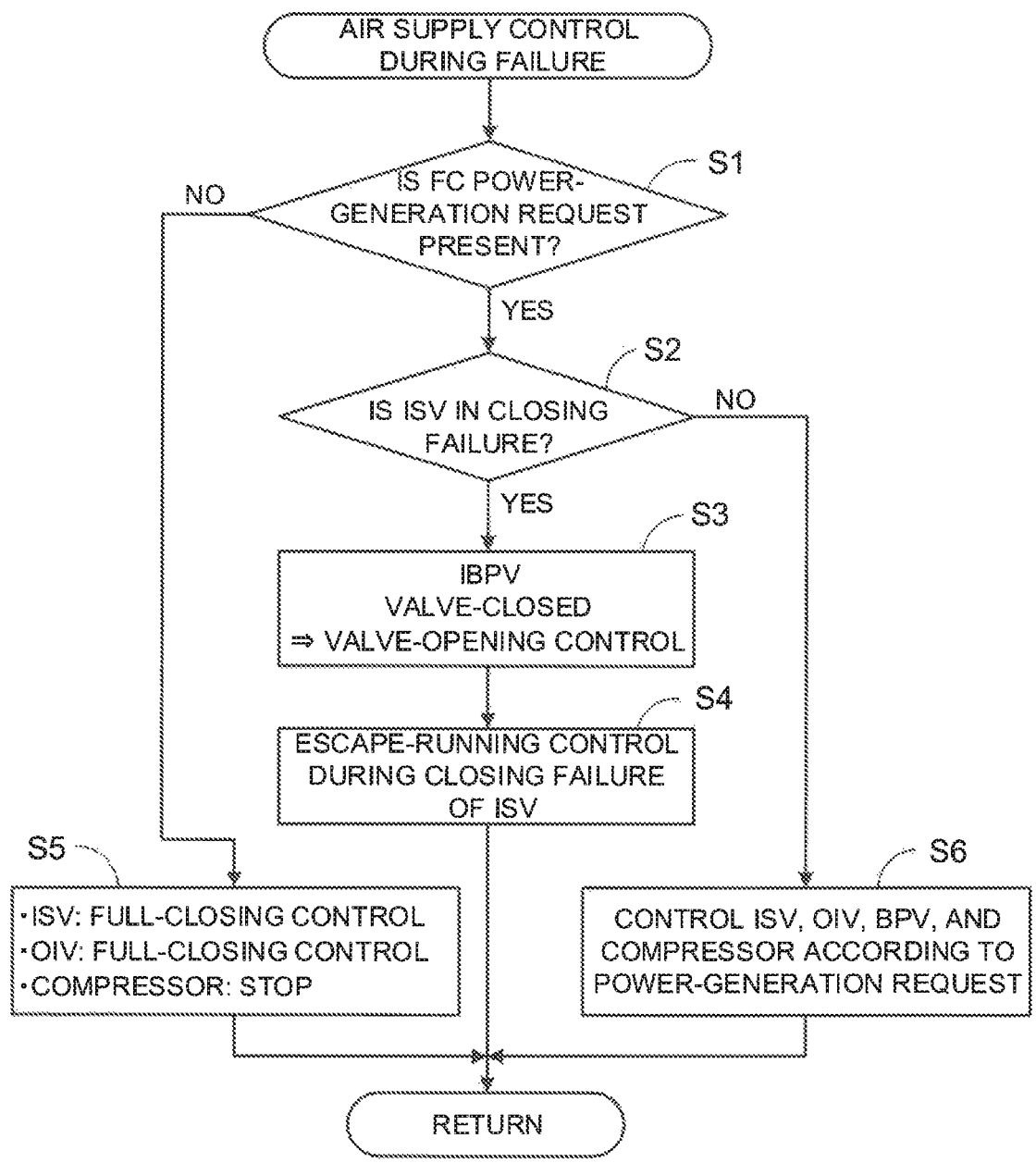
FIG. 14 is a control flowchart in the first embodiment.

To be concrete, the controller 201 executes the control based on a control flowchart shown in FIG. 14. The controller 201 firstly determines whether or not a power-generation request is present (step S1). When the power-generation request is present (step S1: YES), it is then determined whether or not the inlet sealing valve 174 is in closing failure (step S2). This closing failure is determined based on situations that the opening degree of the inlet sealing valve 174 remains unchanged even when the motor 32 is energized, a resistance value increases, or other factors. In contrast, when the power-generation request is not present (step S1: NO), the controller 201 executes full-closing control to fully close the inlet sealing valve 174 and the outlet integration valve 181 and stops the compressor 172 (step S5).

At that time, if the inlet sealing valve 174 is in closing failure (step S2: YES), the controller 201 energizes the inlet bypass valve 192 to open it (step S3). Accordingly, even if the inlet sealing valve 174 fails to open due to a failure such as breaking of wire, the inlet bypass valve 192 is opened, thus allowing supply of air to the fuel cell stack 111 through the inlet-side bypass passage 164.

After opening the inlet bypass valve 192, the controller 201 executes escape-running control during closing failure of the inlet sealing valve 174 (step S4). Concretely, to perform escape running during closing failure of the inlet sealing valve 174, the controller 201 controls the outlet integration valve 181 to a target opening degree for escape running and controls the number of revolutions of the compressor 172 and the opening degree of the bypass valve 191 to allow supply of a target amount of air for escape running to the fuel cell stack 111. Thus, even if the inlet sealing valve 174 fails to open due to closing failure, escape running can be reliably performed.

When the inlet sealing valve 174 is not in closing failure (step S2: NO), the controller 201 controls the inlet sealing valve 174, the outlet integration valve 181, the bypass valve 191, and the compressor 172 according to the power-generation request (step S6). To be concrete, the controller 201 fully opens the inlet sealing valve 174 and also controls the outlet integration valve 181 to a target opening degree according to the power-generation request, and further controls the number of revolutions of the compressor 172 and the opening degree of the bypass valve 191 to supply air to the fuel cell stack 111 by a target amount depending on the power-generation request.

Figure 15:
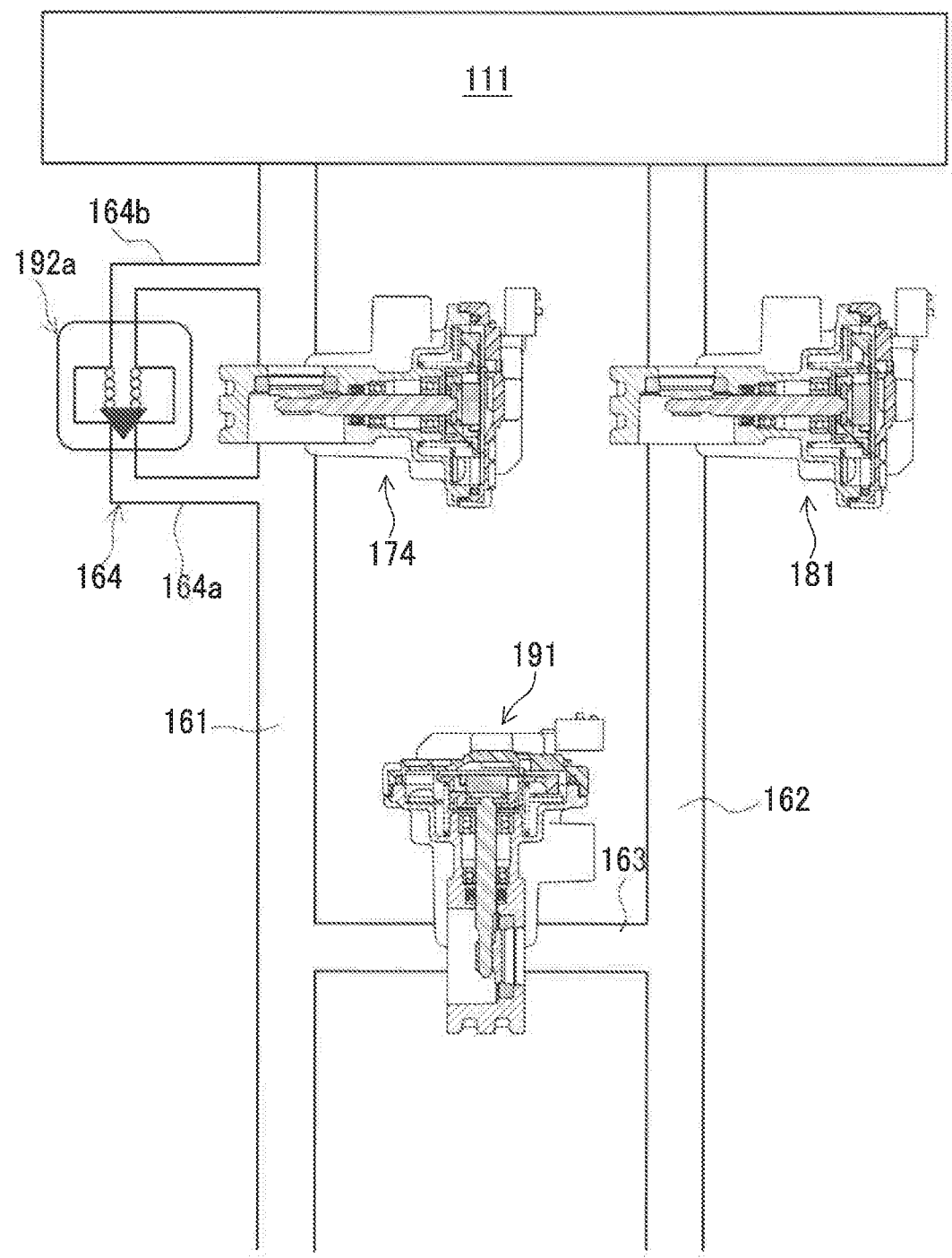
FIG. 15 is a view of a modified example of the inlet bypass valve.
Figure 16:
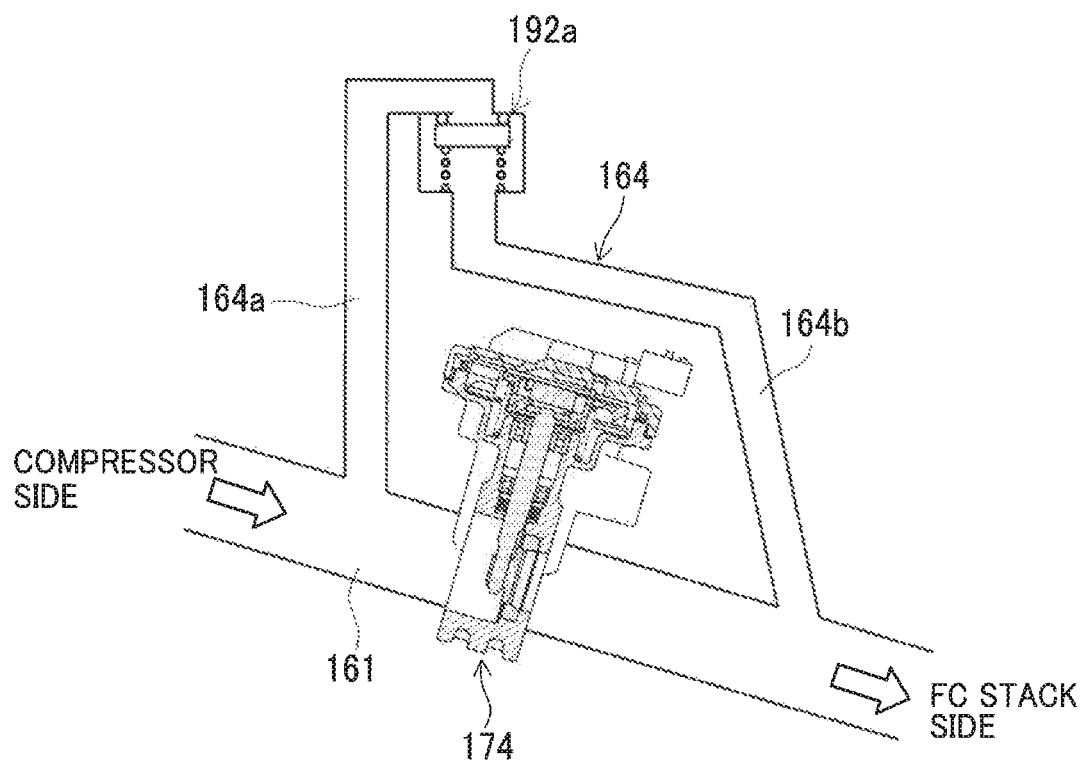
FIG. 16 is a view showing placement (mounting state) and structure of the modified example of the inlet bypass valve.

A modified example of the first embodiment will be described below referring to FIGS. 15 and 16. In this modified example, a relief valve, not a solenoid valve, is used as the inlet bypass valve 192a. This relief valve opens when a differential pressure between the inflow pipe 164a and the outflow pipe 164b of the inlet-side bypass passage 164 becomes a fixed value (e.g. 200 kPa) or more. Further, as shown in FIG. 16, the inlet bypass valve (the relief valve) 192a is placed so that the negative pressure generated in the fuel cell stack 111 (stack negative pressure) acts in a valve opening direction and the air pressure increased in the inflow pipe 164a of the inlet-side bypass passage 164 (compressor pressure) by operation of the compressor 172 acts in a valve opening direction. The inlet bypass valve 192a is placed in a higher position than the fuel cell stack 111 to avoid accumulation of by-product water in the outflow pipe 164b of the inlet-side bypass passage 164, that is, to allow the by-product water to flow to the fuel cell stack 111.

In this modified example, if the inlet sealing valve 174 fails in a closed state (closing failure), the controller 201 increases the number of revolutions of the compressor 172 to increase the compressor pressure to open the inlet bypass valve (the relief valve) 192a. This makes it possible to supply air to the fuel cell stack 111 through the inlet-side bypass passage 164. The escape running can thus be reliably performed. Instead of the inlet bypass valve (the relief valve) 192a, an inlet bypass valve 192b (a safety valve 301) which will be described later may be adopted.

According to the fuel cell system 101 in the first embodiment described in detail above, if the inlet sealing valve 174 is in closing failure, the inlet bypass valve 192 (192a, 192b) is made to open, thus allowing supplying air to the fuel cell stack 111 through the inlet-side bypass passage 164. The escape running can therefore be reliably carried out.

Second Embodiment

A second embodiment will be described below. Like parts or components to those in the first embodiment are designated by same reference numerals and will not be further explained. The following description is therefore given with a focus on differences from the first embodiment.

Figure 17:
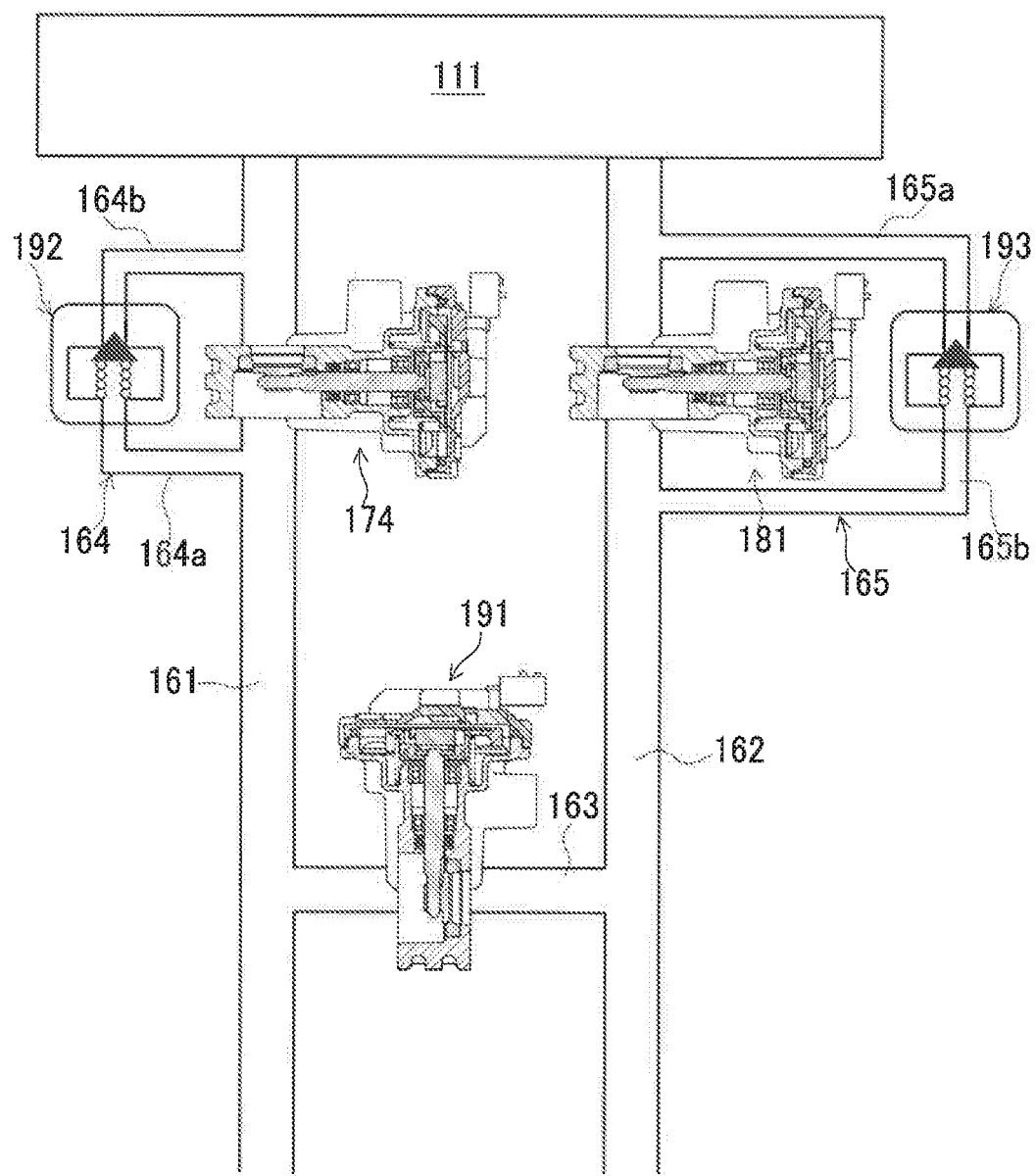
FIG. 17 is a schematic configuration view of an air system in a second embodiment.

The second embodiment is identical in basic structure to the first embodiment; however, as shown in FIG. 17, the configuration of the air system 113 is different from that in the first embodiment. Specifically, a similar structure on the outlet side of the fuel cell stack 111 is also provided to that on the inlet side. To be concrete, an outlet-side bypass passage 165 is provided connecting to the air exhaust passage 162 by detouring around the outlet integration valve 181. The outlet-side bypass passage 165 is provided with an inflow pipe 165a and an outflow pipe 165b. The outlet-side bypass passage 165 is one example of a downstream-side bypass passage in the present disclosure. In this outlet-side bypass passage 165, an outlet bypass valve 193 is placed.

In the present embodiment, the outlet bypass valve 193 is a solenoid valve configured to open and close in response to a command signal from the controller 201. The outlet bypass valve 193 is one example of a downstream-side bypass valve of the present disclosure. When this outlet bypass valve 193 is opened, air offgas is discharged to the outside from the fuel cell stack 111 through the inflow pipe 165a of the outlet-side bypass passage 165, the outlet bypass valve 193, and the outflow pipe 165b of the outlet-side bypass passage 165. Accordingly, if the outlet integration valve 181 is in closing failure (i.e., the outlet integration valve 181 fails in a closed position) by breaking of wire or other causes, the outlet-side bypass passage 165 allows smooth discharge of air offgas from the fuel cell stack 111 to the outside.

Figure 18:
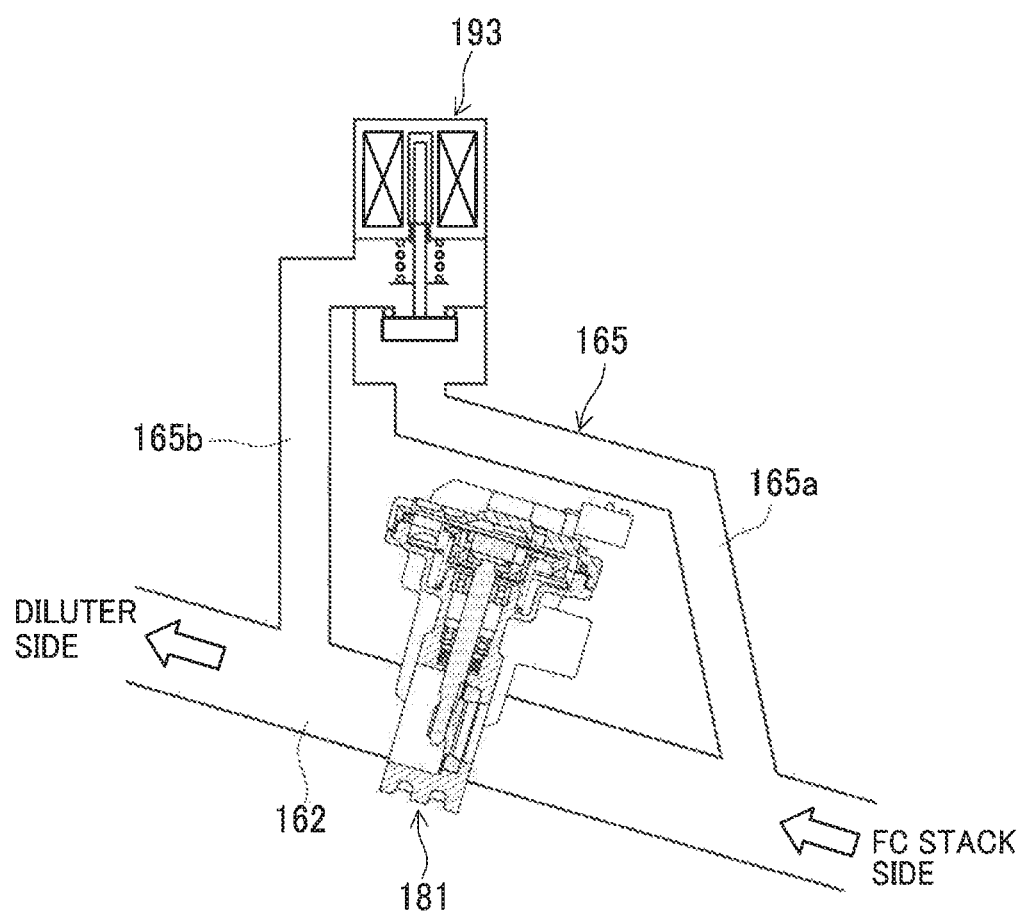
FIG. 18 is a view showing placement (mounting state) and structure of an outlet bypass valve in the second embodiment.

Herein, the outlet bypass valve 193 is a normally-closed solenoid valve and configured to open by moving a movable iron core in a direction away from a fixed iron core during energization as shown in FIG. 18. The outlet bypass valve (solenoid valve) 193 is positioned so that the negative pressure (stack negative pressure) generated in the fuel cell stalk 111 acts in the valve opening direction and reversely the positive pressure (stack positive pressure) generated in the fuel cell stack 111 acts in the valve closing direction. Further, the outlet bypass valve 193 is placed in a higher position than the fuel cell stack 111 to avoid accumulation of by-product water in the inflow pipe 165a of the outlet-side bypass passage 165, that is, to allow the by-product water to flow to the fuel cell stack 111.

In the fuel cell system 101, if the outlet integration valve 181 fails to open due to closing failure, the following control (Air supply control during failure is executed to stably supply air to the fuel cell stack 111 to allow reliable escape running, or pull-over.

Figure 19:
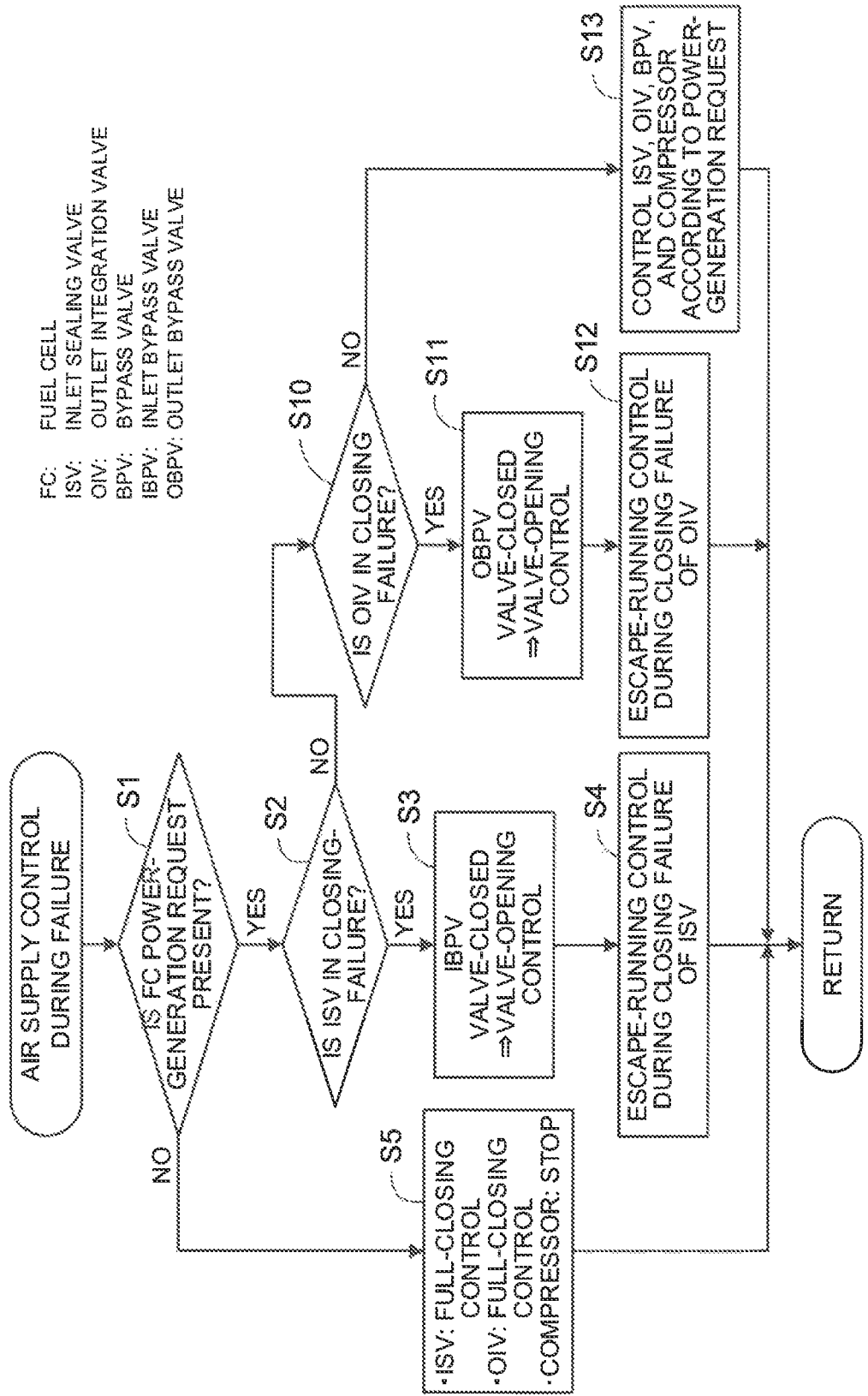
FIG. 19 is a control flowchart in the second embodiment.

To be concrete, the controller 201 executes the control based on a control flowchart shown in FIG. 19. It is to be noted that the processings in steps S1 to S5 are the same as those in the first embodiment. The controller 201 firstly determines whether or not a power-generation request is present (step S1). When the power-generation request is present (step S1: YES), it is then determined whether or not the inlet sealing valve 174 is in closing failure (step S2). In contrast, if the power-generation request is not present (step S1: NO), the controller 201 executes full-closing control to fully close the inlet sealing valve 174 and the outlet integration valve 181 and stop the compressor 172 (step S5).

At that time, if the inlet sealing valve 174 is in closing failure (step S2: YES), the controller 201 performs the same control as in the first embodiment (steps S2 to S4). Reversely, if the inlet sealing valve 174 is not in closing failure (step S2: NO), it is then determined whether or not the outlet integration valve 181 is in closing failure (step S10).

If the outlet integration valve 181 is in closing failure (step S10: YES), the controller 201 energizes the outlet bypass valve 193 to open it (step S11). Accordingly, even if the outlet integration valve 181 fails to open due to a failure such as breaking of wire, the outlet bypass valve 193 is opened, thus allowing smooth discharge of air offgas to the outside through the outlet-side bypass passage 165.

After opening the outlet bypass valve 193, the controller 201 executes escape-running control for closing failure of the outlet integration valve 181 (step S12). Concretely, to perform escape running during closing failure of the outlet integration valve 181, the controller 201 controls the inlet sealing valve 174 to a target opening degree for escape running and controls the number of revolutions of the compressor 172 and the opening degree of the bypass valve 191 to allow supply of a target amount of air for escape running to the fuel cell stack 111. Thus, even if the outlet integration valve 181 fails to open due to closing failure, escape running can be reliably performed.

When the outlet integration valve 181 is not in closing failure (step S10: NO), the controller 201 controls the inlet sealing valve 174, the outlet integration valve 181, the bypass valve 191, and the compressor 172 according to the power-generation request (step S13). To be concrete, the controller 201 fully opens the inlet sealing valve 174 and also controls the outlet integration valve 181 to a target opening degree according to the power-generation request, and further controls the number of revolutions of the compressor 172 and the opening degree of the bypass valve 191 to supply air to the fuel cell stack 111 by a target amount depending on the power-generation request.

Figure 20:
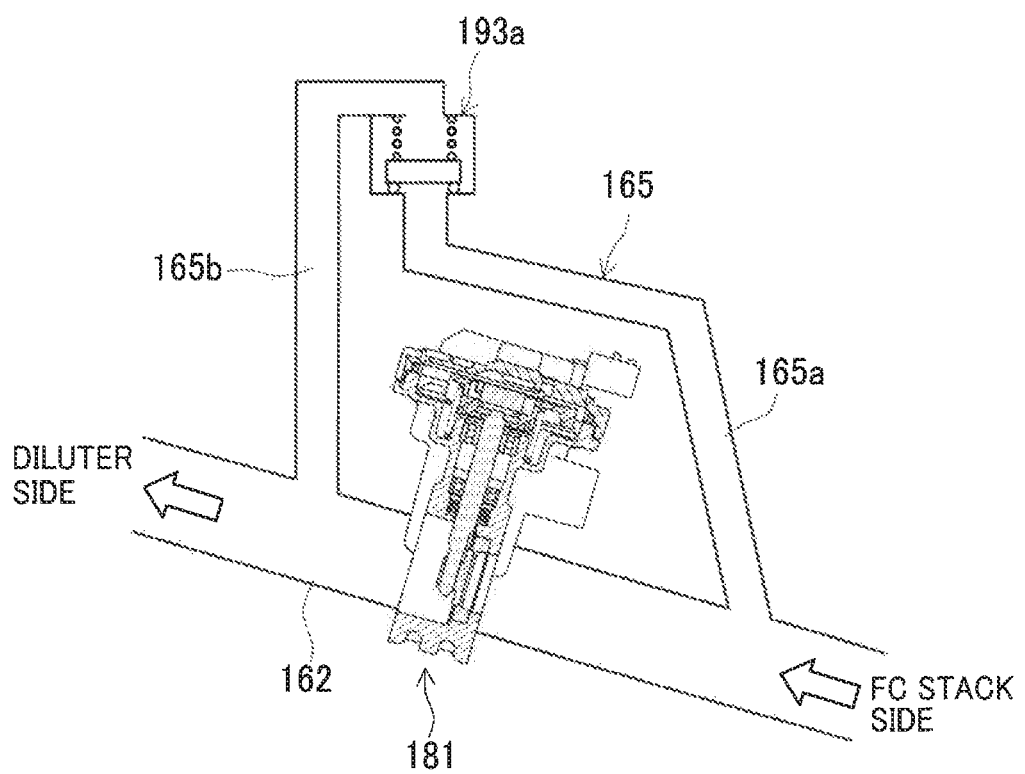
FIG. 20 is a view showing placement (mounting state) and structure of a modified example of the outlet bypass valve.

A modified example of the second embodiment will be described below referring to FIG. 20. In this modified example, a relief valve, not a solenoid valve, is used as the outlet bypass valve 193a. This relief valve opens when a differential pressure between the inflow pipe 165a and the outflow pipe 165b of the outlet-side bypass passage 165 becomes a fixed value (e.g., 300 kPa) or more. Further, the outlet bypass valve (relief valve) 193a is placed so that the negative pressure (stack negative pressure) generated in the fuel cell stack 111 acts in the valve closing direction and the positive pressure (stack positive pressure) generated in the fuel cell stack 111 acts in the valve opening direction. The outlet bypass valve 193a is placed in a higher position than the fuel cell stack 111 to avoid accumulation of by-product water in the inflow pipe 165a of the outlet-side bypass passage 165, that is, to allow the by-product water to flow to the fuel cell stack 111.

In this modified example, if the outlet integration valve 181 fails in a closed state (closing failure), the controller 201 increases the number of revolutions of the compressor 172 to increase the compressor pressure to increase the pressure in the fuel cell stack 111 to thereby open the outlet bypass valve (the relief valve) 193a. This makes it possible to discharge air offgas to the outside through the outlet-side bypass passage 165. The escape running can thus be stably performed.

Figure 21:
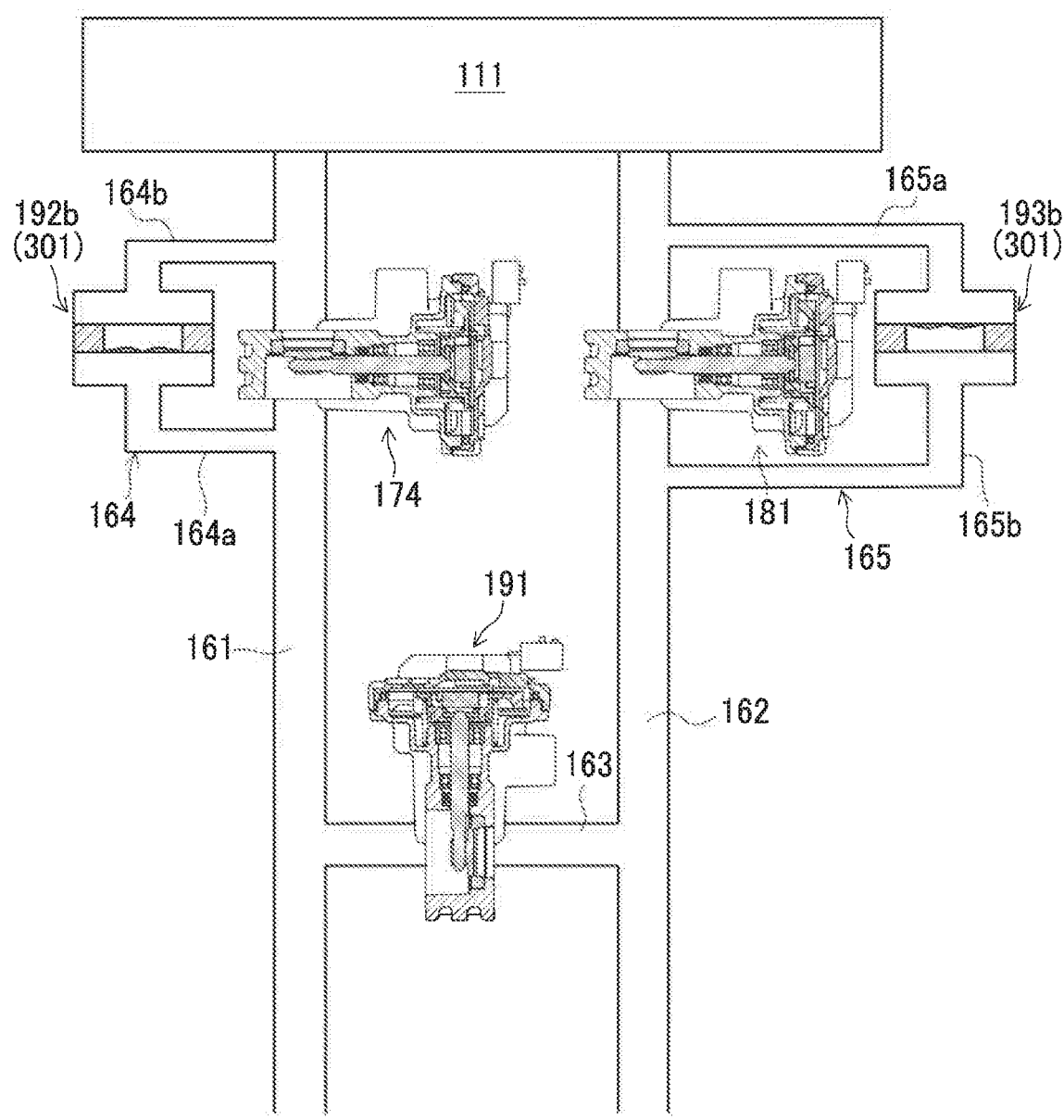
FIG. 21 is a view showing placement (mounting state) and structure of an inlet bypass valve and an outlet bypass valve in a modified example of the second embodiment.
Figure 22:
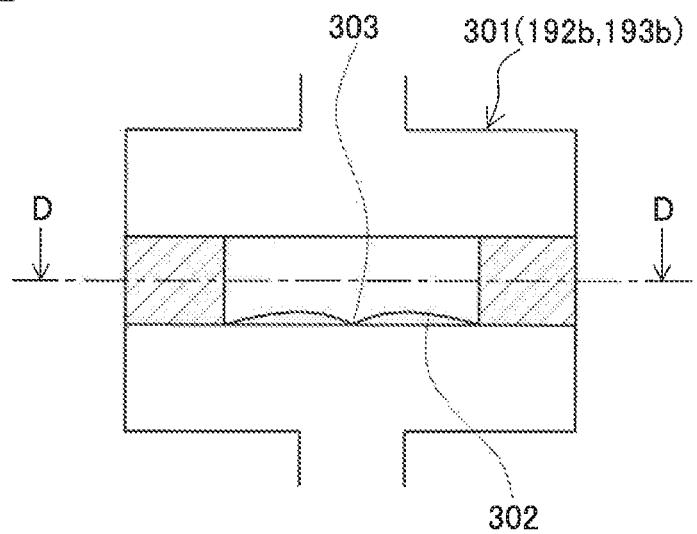
FIG. 22 is a cross-sectional view of a safety valve.
Figure 23:
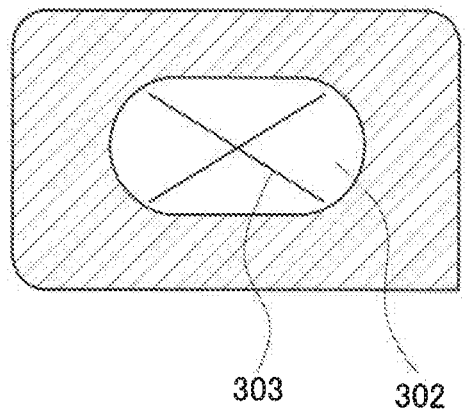
FIG. 23 is a cross-sectional view taken along a line D-D in FIG. 22.
Figure 24:
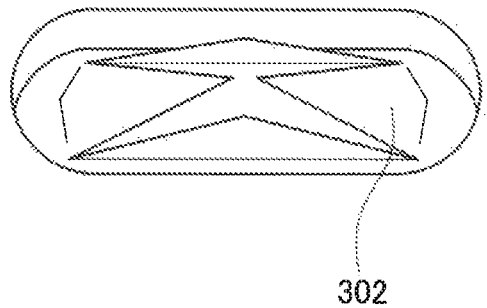
FIG. 24 is a perspective view of a thin plate part of the safety valve and its surroundings when the safety valve is opened.

A modified example of the second embodiment will be described below referring to FIGS. 21 to 24. In this modified example, safety valves 301 are adopted as an inlet bypass valve 192b and an outlet bypass valve 193b as shown in FIG. 21. Each safety valve 301 is provided with a thin plate part 302 formed in a thin plate shape as shown in FIGS. 22 to 24. This thin plate part 302 is formed with a groove 303 (e.g., two grooves intersecting with each other).

The inlet bypass valve 192b (the safety valve 301) is positioned in such an orientation that the negative pressure (stack negative pressure) generated in the fuel cell stack 111 acts in the valve opening direction and also the air pressure (compressor pressure) increased in the inflow pipe 164a of the inlet-side bypass passage 164 by operation of the compressor 172 acts in the valve opening direction. When a differential pressure between the inflow pipe 164a and the outflow pipe 164b of the inlet-side bypass passage 164, that is, between an upstream side and a downstream side of the the inlet bypass valve 192 (the safety valve 301), becomes a first predetermined pressure (e.g., 200 kPa) or more, the thin plate part 302 ruptures or splits off along the groove 303 and thus the inlet bypass valve 192b (the safety valve 301) opens.

Further, the outlet bypass valve 193b (the safety valve 301) is positioned in such an orientation that the negative pressure (stack negative pressure) generated in the fuel cell stack 111 acts in the valve closing direction and the positive pressure (stack positive pressure) generated in the fuel cell stack 111 acts in the valve opening direction. When a differential pressure between the inflow pipe 165a and the outflow pipe 165b of the outlet-side bypass passage 165, that is, between an upstream side and a downstream side of the the outlet bypass valve 192 (the safety valve 301), becomes a second predetermined pressure (e.g., 300 kPa) or more, the thin plate part 302 ruptures or splits off along the groove 303 and thus the outlet bypass valve 193b (the safety valve 301) opens.

Since the safety valves 301 identical in structure are adopted as the inlet bypass valve 192b and the outlet bypass valve 193b as above, cost reduction can be achieved.

According to the fuel cell system in the second embodiment described in detail above, if the inlet sealing valve 174 is in closing failure, the inlet bypass valve 192 (192a, 192b) is made to open, allowing supply of air to the fuel cell stack 111 through the inlet-side bypass passage 164. Furthermore, if the outlet integration valve 181 is in closing failure, the outlet bypass valve 193 (193a, 193b) is made to open, allowing discharge of air offgas to the outside through the outlet-side bypass passage 165. Thus, escape running can be reliably performed.

Third Embodiment

A third embodiment will be described below. Like parts or components to those in the second embodiment are designated by same reference numerals and will not be further explained. The following description is therefore given with a focus on differences from the second embodiment.

The third embodiment is basically identical in system structure to the second embodiment. In the third embodiment, the inlet bypass valve 192 and the outlet bypass valve 193 are both solenoid valves. In the present embodiment, the controller 201 performs, at start-up, releasing pressure from the fuel cell stack 111 (Stack-pressure release control) and detecting failures of the inlet bypass valve (solenoid valve) 192 and the outlet bypass valve (solenoid valve) 193 (OBD control), as well as the air supply control during failure to be executed in the second embodiment.

Figure 25:
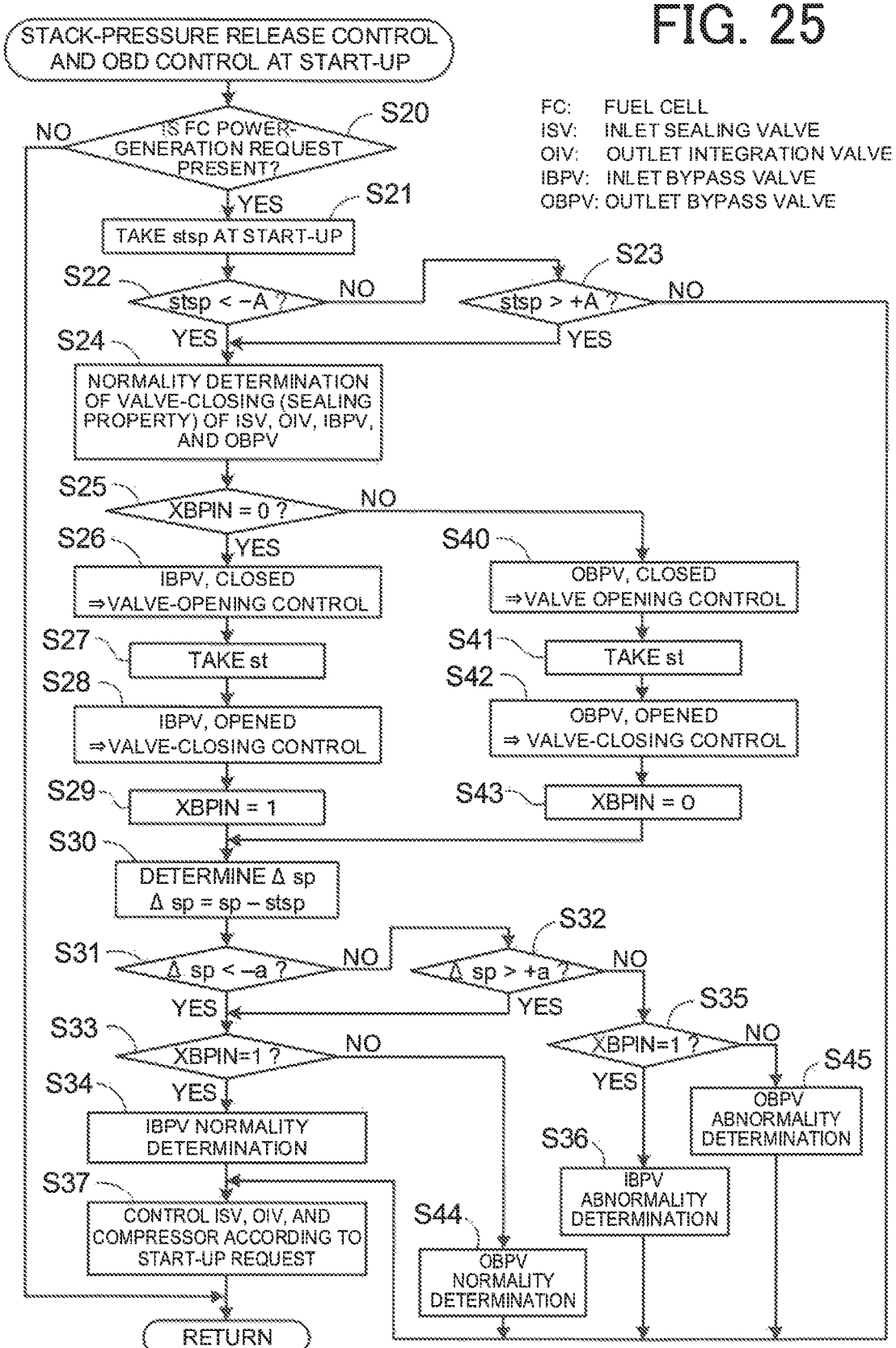
FIG. 25 is a control flowchart (Stack-pressure release control and OBD control) in a third embodiment.

Therefore, the contents of the stack-pressure release control and OBD control at start-up will be described below referring to FIG. 25. The controller 201 firstly determines whether or not a start-up request of the fuel cell stack 111 is present (step S20). When the start-up request is present (step S20: YES), the controller 201 takes, or reads, start-up stack pressure stsp from a stack pressure sensor 111P (step S21). When the start-up request is not present (step S20: NO), this processing routine is terminated.

Following step S21, the controller 201 determines whether or not the internal pressure of the fuel cell stack 111 is atmospheric pressure, that is, whether or not the fuel cell stack 111 has air leaks. To be concrete, it is firstly determined whether or not the start-up stack pressure stsp is smaller than a predetermined pressure "−A (about several kPa)" (step S22) and whether or not the start-up stack pressure stsp is larger than a predetermined pressure "+A (about several kPa)" (step S23).

At that time, when the start-up stack pressure stsp is smaller than −A (stsp<−A) (step S22: YES) or when the start-up stack pressure stsp is larger than +A (stsp>+A) (step S23: YES), indicating no leakage from the fuel cell stack 111, the controller 201 determines that the inlet sealing valve 174, outlet integration valve 181, inlet bypass valve 192, and outlet bypass valve 193 are all closed normally and the fuel cell stack 111 is sealingly closed (Normality Determination of Valve-closing state (Sealing property) of ISV (inlet sealing valve), OIV (outlet integration valve), IBPV (inlet bypass valve), and OBPV (outlet bypass valve)) (step S24).

In contrast, when the start-up stack pressure stsp is larger than −A (stsp>−A) (step S22: NO) and the start-up stack pressure stsp is smaller than +A (stsp<+A) (step S23: NO), the controller 201 implements the processing in step S37 described later.

When determining that the inlet sealing valve 174, outlet integration valve 181, inlet bypass valve 192, and outlet bypass valve 193 are all closed normally, the controller 201 then determines whether or not an inlet-bypass-valve (IBPV) opened/closed flag XBPIN is 0 (step S25). This IBPV opened/closed flag XBPIN is a flag representing that an opening/closing operation of the inlet bypass valve 192 has been already completed. This flag XBPIN is specifically set to 1 when the opening/closing operation that opens the inlet bypass valve 192 and then closes the same again has been performed or set to 0 when the opening/closing operation that opens the outlet bypass valve 193 and then closes the same again has been performed.

When the IBPV opened/closed flag XBPIN is 0, that is, when the opening/closing operation of the inlet bypass valve 192 has not been performed after start-up (step S25: YES), the controller 201 executes valve-opening control to bring the inlet bypass valve 192 from a valve-closed state to a valve-open state (step S26). In other words the start-up pressure release control is performed. Thus, the internal pressure of the fuel cell stack 111 becomes atmospheric pressure, so that the inlet sealing valve 174 and the outlet integration valve 181 can be opened while the surface pressure of the rubber seat 21 with respect to the valve element 14 in each of the inlet sealing valve 174 and the outlet integration valve 181 has been decreased. Accordingly, in each of the inlet sealing valve 174 and the outlet integration valve 181, it is possible to prevent sticking or fixing between the rubber seat 21 and the valve element 14 or wearing away of the seal part 21a of the rubber seat 21.

Subsequently, the controller 201 takes stack pressure st from the stack pressure sensor 111P (step S27) and then executes valve-closing control to bring the inlet bypass valve 192 from the valve-open state to the valve-closed state (step S28) and sets the flag XBPIN to 1 (step S29). Thereafter, a stack-pressure change amount Δsp (=sp−stsp) is calculated (step S30). Since the inlet bypass valve 192 is opened and closed at start-up in the above manner, it is possible to prevent sticking or fixing due to long-term non-operation of the inlet bypass valve 192.

The controller 201 further determines whether or not the inlet bypass valve 192 is normally operating, that is, whether or not the stack pressure has been changed by opening/closing operation of the inlet bypass valve 192. To be concrete, it is determined whether or not the stack-pressure change amount Δsp is smaller than a predetermined value "−a (about several kPa)" (step S31) and whether or not the stack-pressure change amount Δsp is larger than a predetermined value "+a (about several kPa)" (step S32).

At that time, when the stack-pressure change amount Δsp is smaller than −a (Δsp<−a) (step S31: YES) or when the stack-pressure change amount Δsp is larger than +a (Δsp>+a) (step S32: YES), if the IBPV opened/closed flag XBPIN is 1 (step S33: YES), the controller 201 determines that the inlet bypass valve 192 is normally operating (IBPV Normality Determination) (step S34). Reversely, when the stack-pressure change amount Δsp is larger than −a (Δsp>−a) (step S31: NO) and the stack-pressure change amount Δsp is smaller than +a (Δsp<+a) (step S32: NO) if the IBPV opened/closed flag XBPIN is 1 (step S35: YES), the inlet bypass valve 192 is determined to be abnormal (IBPV Abnormality Determination) (step S36). In the above manner, failures of the inlet bypass valve 192 can also be detected.

Thereafter, the controller 201 controls the inlet sealing valve 174, outlet integration valve 181, and compressor 172 according to the start-up request (step S37). Specifically, the controller 201 fully opens the inlet sealing valve 174, controls the outlet integration valve 181 to a target opening degree for start-up, and controls the number of revolutions of the compressor 172 for start-up.

At next start-up in which OR check (OBD control) on the inlet bypass valve 192 has been terminated, the IBPV opened/closed flag XBPIN is 1. Therefore, at the next start-up, a determination result in step S25 is negative. The controller 201 thus executes the valve-opening control to bring the outlet bypass valve 193 from the valve-closed state to the valve-open state (step S40). Specifically, the start-up pressure release control is performed on the outlet side. Thus, the internal pressure of the fuel cell stack 111 becomes atmospheric pressure, so that the inlet sealing valve 174 and the outlet integration valve 181 can be opened while the surface pressure of the rubber seat 21 on the valve element 14 in each of the inlet sealing valve 174 and the outlet integration valve 181 has been decreased. Accordingly, in each of the inlet sealing valve 174 and the outlet integration valve 181, it is possible to prevent sticking or fixing between the rubber seat 21 and the valve element 14 or wearing away of the seal part 21a of the rubber seat 21.

Subsequently, the controller 201 takes stack pressure st from the stack pressure sensor 111P (step S41) and then executes valve-closing control to bring the outlet bypass valve 193 from the valve-open state to the valve-closed state (step S42) and sets the flag XBPIN to 0 (step S43). Thereafter, a stack-pressure change amount Δsp (=sp−stsp) is calculated (step S30). Since the outlet bypass valve 193 is opened or closed at the next startup in the above manner, it is possible to prevent sticking or fixing due to long-term non-operation of the outlet bypass valve 193.

The controller 201 further determines whether or not the outlet bypass valve 193 is normally operating, that is, whether or not the stack pressure has been changed by opening/closing operation of the outlet bypass valve 193. To be concrete, it is determined whether or not the stack-pressure change amount Δsp is smaller than the predetermined value "−a (about several kPa)" (step S31) and whether or not the stack-pressure change amount Δsp is larger than the predetermined value "+a (about several kPa)" (step S32).

At that time, when the stack-pressure change amount Δsp is smaller than −a (Δsp<−a) (step S31: YES) or when the stack-pressure change amount Δsp is larger than +a (Δsp>+a) (step S32: YES), if the IBPV opened/closed flag XBPIN is 0 (step S33: NO), the controller 201 determines that the outlet bypass valve 193 is normally operating (OBPV Normality Determination) (step S44). Reversely, when the stack-pressure change amount Δsp is larger than −a (Δsp>−a) (step S31: NO) and the stack-pressure change amount Δsp is smaller than +a (Δsp<+a) (step S32: NO), if the IBPV opened/closed flag XBPIN is 0 (step S35: NO), the outlet bypass valve 193 is determined to be abnormal (OBPV Normality Determination) (step S45). Since the inlet bypass valve 192 and the outlet bypass valve 193 are alternately subjected to the OBD check at start-up as described above, failures of the outlet bypass valve 193 can also be detected.

Thereafter, the controller 201 controls the inlet sealing valve 174, outlet integration valve 181, and compressor 172 according to the start-up request. Specifically, the controller 201 fully opens the inlet sealing valve 174, controls the outlet integration valve 181 to a target opening degree for start-up, and controls the number of revolutions of the compressor 172 for start-up (step S37).

After start-up, if the inlet sealing valve 174 or the outlet integration valve 181 fails in a closed position (closing failure), the controller 201 performs the control explained in the second embodiment (see FIG. 19). Accordingly, even if the inlet sealing valve 174 or the outlet integration valve 181 is in closing failure, escape running can also be carried out.

According to the fuel cell system in the third embodiment described in detail above, it is possible to prevent sticking between the rubber seat 21 and the valve element 14 and wearing away of the seal part 21a of the rubber seat 21 in each of the inlet sealing valve 174 and the outlet integration valve 181 and further prevent sticking or fixing in the inlet bypass valve 192 and the outlet bypass valve 193 due to long-term non-operation, and detect failures of the inlet bypass valve 192 and the outlet bypass valve 193 in addition to the effects in the second embodiment.

Fourth Embodiment

A fourth embodiment will be described below. Like parts or components to those in the first embodiment are designated by same reference numerals and will not be further explained. The following description is therefore made with a focus on differences from the first embodiment.

Figure 26:
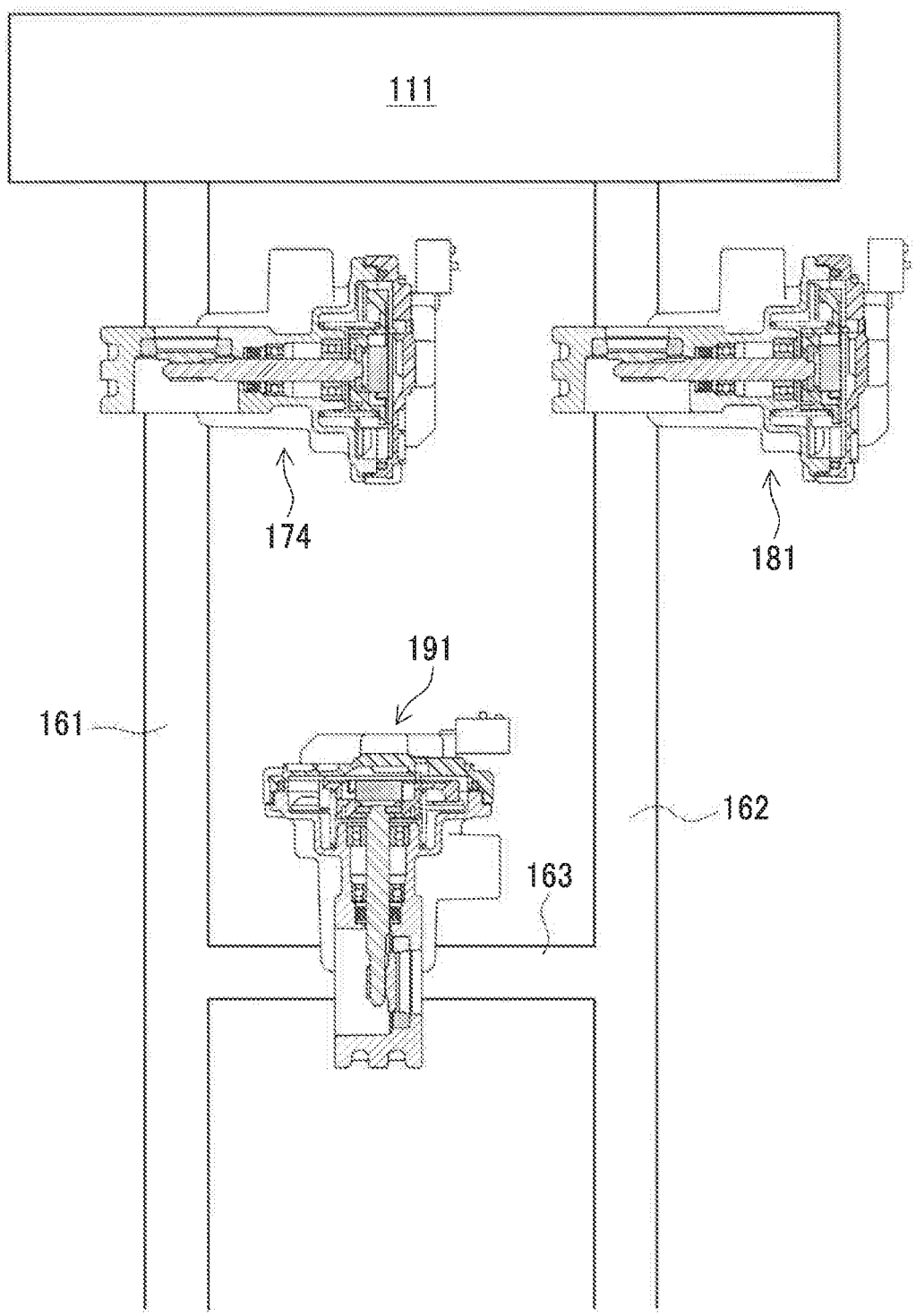
FIG. 26 is a schematic configuration view of an air system in a fourth embodiment.
Figure 27:
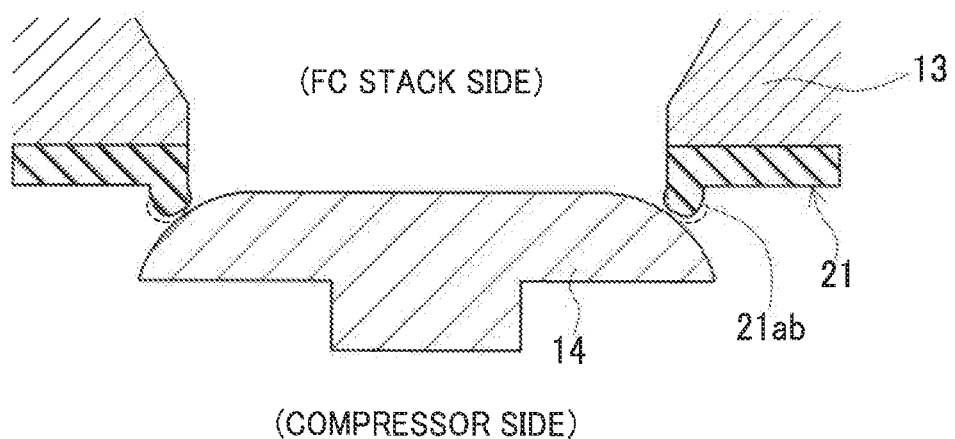
FIG. 27 is a view showing the shape of a rubber seat of an inlet sealing valve during escape running in the fourth embodiment.

In the fourth embodiment, unlike the aforementioned first to third embodiments, the air system 113 is not provided with the inlet bypass valve and the outlet bypass valve as shown in FIG. 26. As shown in FIG. 27, furthermore, the rubber seat 21 of the inlet seating valve 174 is provided with a bead seal part 21ab having a bead-like shape. The rubber seat 21 of the outlet integration valve 181 is provided with a lip seal part 21a1 (see FIG. 28).

Herein, the bead seal part 21ab is one example of a "low pressure-resistant part" in the present disclosure, i.e., a part having low resistance to pressure. A region between the valve element 14 and the valve seat 13 (concretely, the bead seal part 21ab) corresponds to one example of a "communication area" in the present disclosure. This communication area in the present embodiment is provided inside the inlet sealing valve 174 as described above. As an alternative, the communication area also may be provided in a position to detour around the inlet sealing valve 174.

If the inlet sealing valve 174 fails in a closed position (closing failure) due to breaking of wire or other causes, the controller 201 increases the number of revolutions of the compressor 172 to raise the compressor pressure. Accordingly, the internal pressure of the air supply passage 161 upstream of the inlet sealing valve 174 rises. Thus, as shown in FIG. 27, the bead seal part 21ab of the rubber seat 21 in the inlet sealing valve 174 is deformed so as to be pressed inward, or squashed, thereby causing a scaling failure. This consequently opens the communication area, i.e. creates a clearance therein, between the valve element 14 and the bead seal part 21*ab*, thus providing communication between the upstream side and the downstream side in the passage 11 of the inlet sealing valve 174 through the communication area. This can supply air to the fuel cell stack 111. Accordingly, even without providing the inlet bypass valve, the escape running can be reliably performed if the inlet sealing valve 174 fails to open due to closing failure. Moreover, the outlet integration valve 181 is controlled by the controller 201 to a target opening degree needed for escape running.

Figure 28:
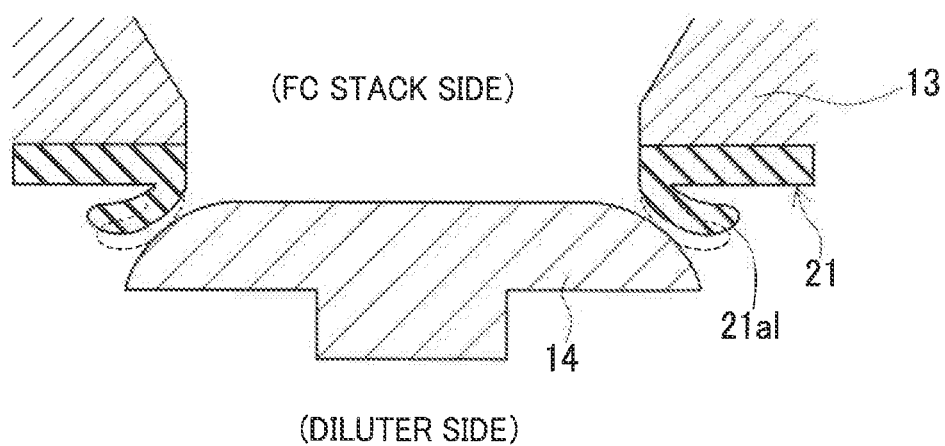
FIG. 28 is a view showing the shape of a rubber seat of an outlet sealing valve during running in the fourth embodiment.

In contrast, if the outlet integration valve 181 fails in a closed position (closing failure) due to breaking of wire or other causes, the controller 201 controls the inlet sealing valve 174 to open and increases the number of revolutions of the compressor 172 to thereby increase the compressor pressure. Accordingly, the internal pressure of the fuel stack 111 (stack pressure) rises, pressing the lip seal part 21*a*1 of the rubber seat 21 in the outlet integration valve 181 to be expanded outwardly as shown in FIG. 28. This consequently forms a clearance, that is, opens the communication area, between the valve element 14 and the lip seal part 21*ab*, providing communication between the upstream side and the downstream side in the passage 11, thereby allowing smooth discharge of air offgas from the fuel cell stack 111. Further, since the stack pressure can be changed by control of the number of revolutions of the compressor 172, the amount of air to be supplied to the fuel cell stack 111 can be controlled during escape running. Accordingly, even without providing the outlet bypass valve, the escape running can be reliably performed if the outlet integration valve 181 fails to open due to closing failure.

According to the fuel cell system in the fourth embodiment described in detail above, if the inlet sealing valve 174 fails in a closed position, the compressor pressure is increased and hence the bead seal part 21*ab* is deformed, thereby opening the communication area between the valve element 14 and the bead seal part 21*ab* to provide communication between the upstream side and the downstream side in the passage 11 to supply air to the fuel cell stack 111. Further, if the outlet integration valve 181 fails in a closed position, the compressor pressure is increased and hence the lip seal part 21*a*1 is pressed to be expanded outwardly. These operations enable smooth discharge of air offgas to the outside and thus allow stable escape running.

Fifth Embodiment

A fifth embodiment will be described below. Like parts or components to those in the fourth embodiment are designated by same reference numerals and will not be further explained. The following description is therefore made with a focus on differences from the fourth embodiment.

Figure 29:
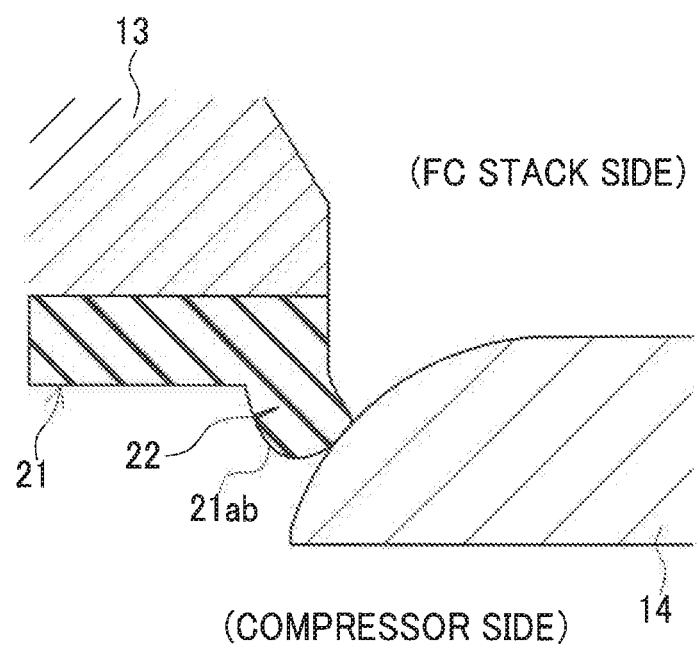
FIG. 29 is a view of a bead seal part of an inlet sealing valve in a fifth embodiment.

The fifth embodiment is basically identical in structure to the fourth embodiment; however, the bead seal part 21*ab* of the inlet sealing valve 174 is provided with a slit 22 as shown in FIG. 29. The slit 22 is formed in the outer peripheral surface of the bead seal part 21*ab*. This slit 22 is one example of a "low pressure-resistant part" in the present disclosure. Besides the slit 22, the low pressure-resistant part may be provided as a blocking plate for shutting off a detouring path extending by detouring around the inlet sealing valve 174, the blocking plate having a lower resistance to pressure than parts or components provided in the detouring path. For example, a metal plate with a slit may be adopted.

Figure 30:
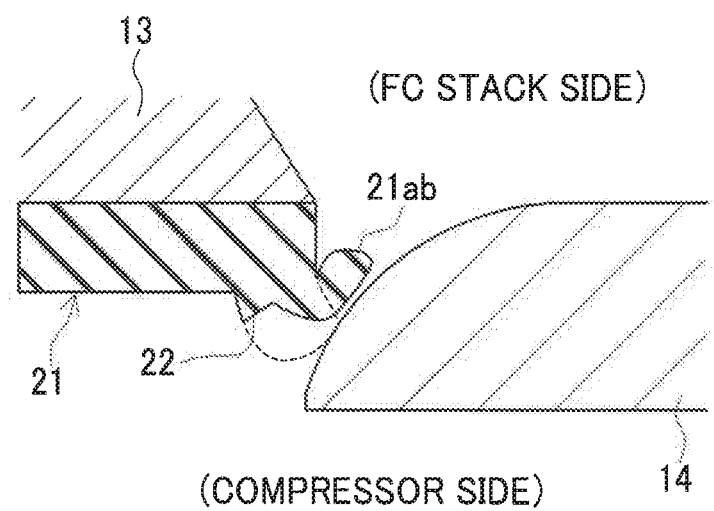
FIG. 30 is a view showing the shape of a rubber seat of the inlet sealing valve during escape running.

If the inlet sealing valve 174 fails in a closed position due to for example breaking of wire, the controller 201 increases the number of revolutions of the compressor 172 to increase the compressor pressure to generate crack breakdown or fracture of the bead seal part 21*ab* of the rubber seat 21 in the inlet sealing valve 174 along the slit 22 as shown in FIG. 30. This consequently opens the communication area between the valve element 14 and the bead seal part 21*ab*. Thus, air can be supplied to the fuel cell stack 111.

At that time, the opening area (i.e. opening planar dimension) of the communication area is larger than in the fourth embodiment. This can increase the amount of air to be supplied to the fuel cell stack 111 as compared with the fourth embodiment. Accordingly, even if the inlet sealing valve 174 fails to open due to closing failure, escape running can be stably performed. The outlet integration valve 181 is controlled by the controller 201 to a target opening degree needed for escape running. If the outlet integration valve 181 fails in a closed position, the same control as in the fourth embodiment is performed.

Herein, if the crack breakdown of the bead seal part 21*ab* is caused during normal driving, some problems may occur. Therefore, the pressure resistance of the bead seal part 21*ab*, at which the crack breakdown occurs, has to be set so high as not to cause the crack breakdown during normal driving. However, when the bead seal part 21*ab* has such a high pressure resistance, the compressor 172 may need to be increased in size and cost in order to cause the crack breakage as needed.

Figure 31:
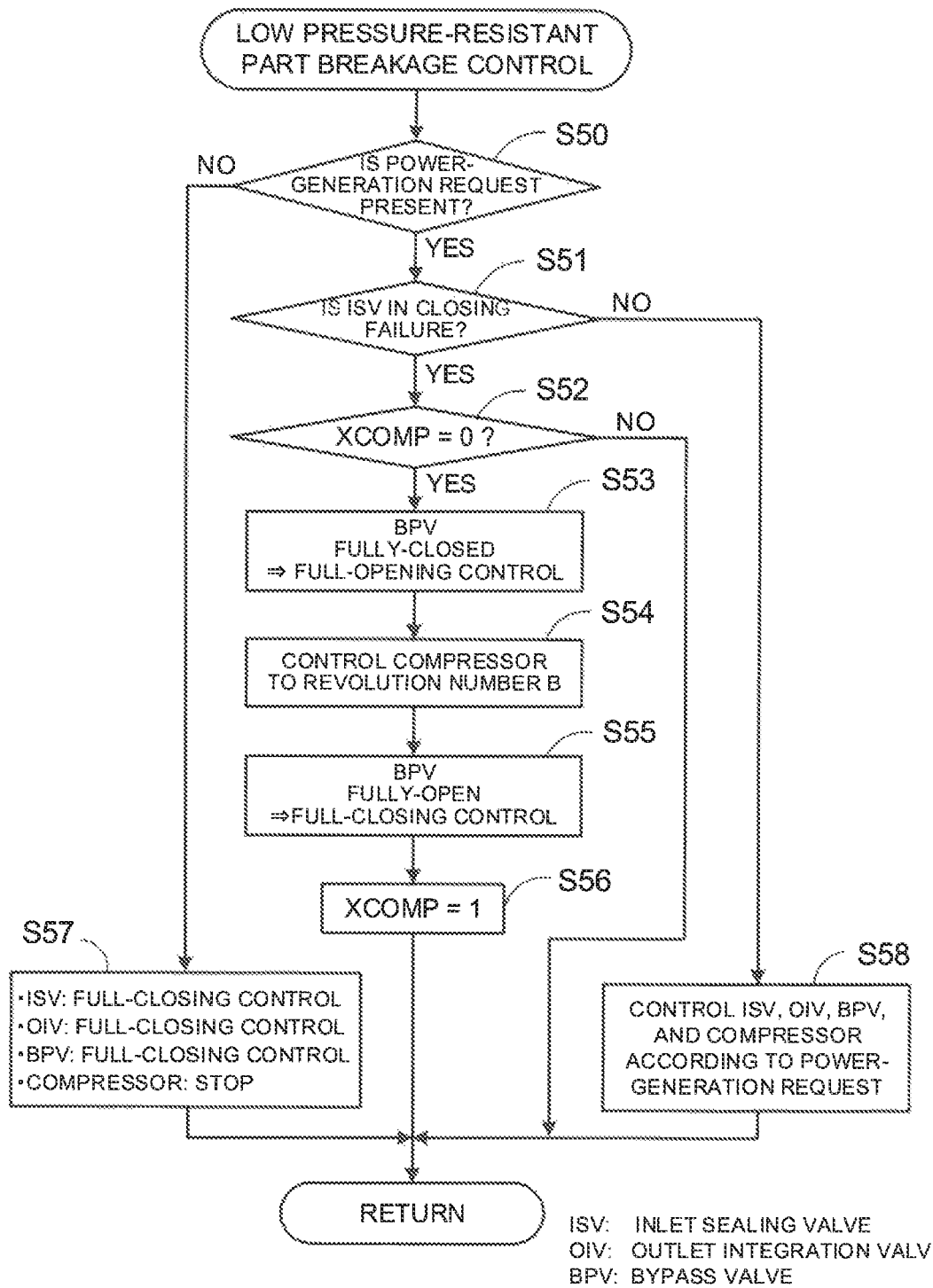
FIG. 31 is a control flowchart in the fifth embodiment.

In the fifth embodiment, therefore, a conventional compressor is used as the compressor 172 and the compressor pressure is temporarily regulated to an excessively supercharged state impossible to be generated during normal driving in order to cause crack breakdown of the bead seal part 21*ab*. To be concrete, the controller 201 executes the control (Low pressure-resistant part breakage control) based on a control flowchart shown in FIG. 31.

The controller 201 firstly determines whether or not the power-generation request is present (step S50). If the power-generation request is present (step S50: YES), the controller 201 then check whether or not the inlet sealing valve 174 is in closing failure (step S51). Reversely, if the power-generation request is not present (step S50: NO), the controller 201 performs the full-closing control to fully close the inlet sealing valve 174, outlet integration valve 181, and bypass valve 191, and also stops the compressor 172 (step S57).

At that time, if the inlet sealing valve 174 is in closing failure (step S51: YES), if a breakage completion flag XCOMP is 0 (step S52: YES), the controller 201 executes S53). The breakage completion flag XCOMP is a flag representing whether or not crack breakdown of the bead seal part 21*ab* has been completed. This flag is set to 0 if the crack breakdown has not been completed or set to 1 if the crack breakdown has been completed. Further, the controller 201 controls the number of revolutions of the compressor 172 to the number B of revolutions previously determined to create an excessively supercharged state (step S54). Accordingly, the number of revolutions of the compressor 172 is increased, raising the compressor pressure.

When the number of rotations of the compressor 172 reaches the revolution number B, the controller 201 performs the full-closing control to fully close the bypass valve 191 from the fully-open state (step S55). Accordingly, the compressor pressure steeply rises, causing the internal pressure of the air supply passage 161 on the upstream side of the inlet sealing valve 174 to instantaneously abruptly increase. In fact, the compressor pressure comes to an excessively surpercharged state unlikely to occur during normal driving, so that the compressor pressure exceeds a breakdown pressure level needed to crack and break down the bead seal part 21*ab*. Therefore, the bead seal part 21*ab* is fractured along the slit 22 as shown in FIG. 30. Thus, the communication area is opened between the valve element 14 and the bead seal part 21*ab*. This allows air to be supplied to the fuel cell stack 111. Accordingly, the escape running can be performed.

Thereafter, the controller 201 sets the breakage completion flag XCOMP to 1 (step S56). Reversely, if the inlet sealing valve 174 is not in closing failure (step S51: NO) the controller 201 controls the inlet sealing valve 174, outlet integration valve 181, bypass valve 191, and compressor 172 in response to the power-generation request. To be concrete, the controller 201 fully opens the inlet sealing valve 174 and also controls the outlet integration valve 181 to a target opening degree corresponding to the power-generation request, and further controls the number of revolutions of the compressor 172 and the opening degree of the bypass valve 191 in order to supply a target amount of air according to the power-generation request to the fuel cell stack 111.

After increasing the number of revolutions of the compressor 172 up to the revolution number B while the bypass valve 191 is in a valve-open state, the controller 201 fully closes the bypass valve 191 to rapidly increase the internal pressure of the air supply passage 161. The compressor pressure comes to an excessively supercharged state unlikely to occur during normal driving can be created without increasing the size (the cost) of the compressor 172. The pressure resistance value at which the bead seal part 21*ab* is crack-broken can be set to a high value. Thus the crack breakdown of the bead seal part 21*ab* can be generated only when escape running is needed. This makes it possible to reliably prevent crack breakdown of the bead seal part 21*ab* from occurring when the compressor pressure simply abnormally rises during normal driving.

Figure 32:
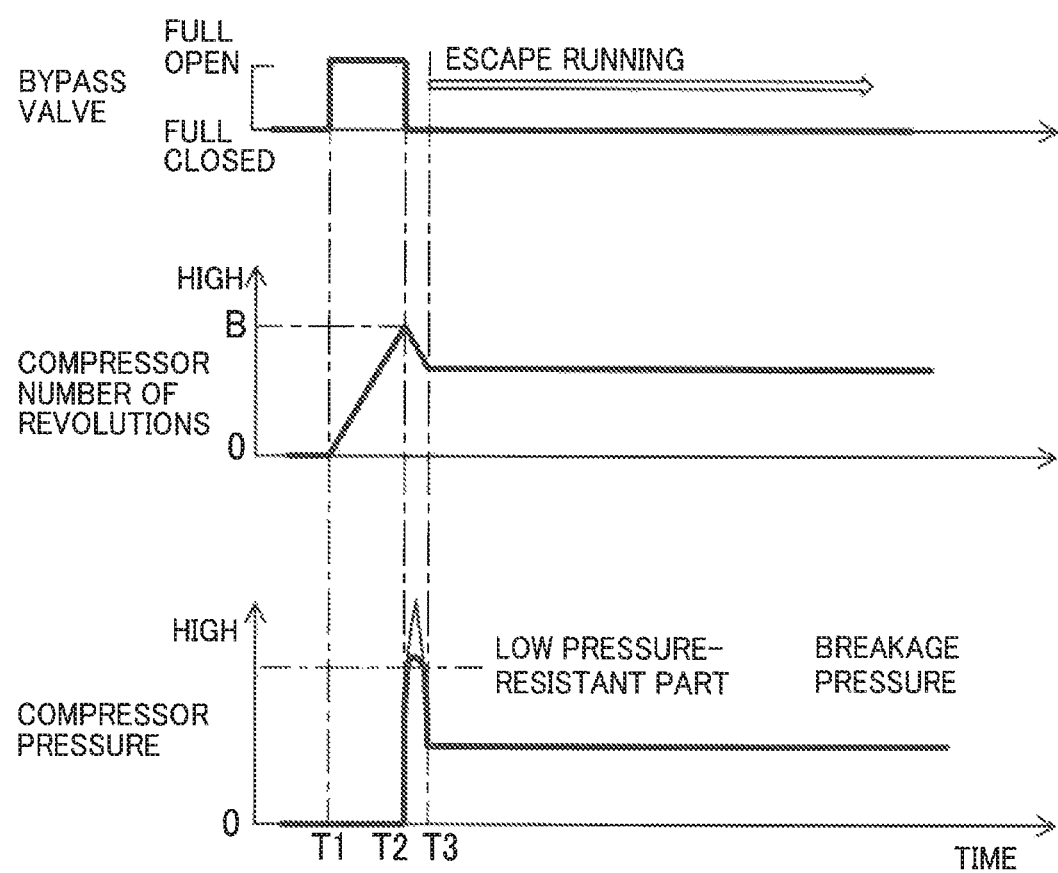
FIG. 32 is a control time chart in the fifth embodiment.

By executing the control based on the aforementioned control flowchart, the control expressed by a control time chart as shown in FIG. 32 for example is performed. In other words, when the inlet scaling valve 174 is determined to be in closing failure at time T1 as shown in FIG. 32, the bypass valve 191 is fully opened from a fully-closed state. Further, the number of revolutions of the compressor 172 is adjusted to the revolution number B. Thus, the number of revolutions of the compressor 172 gradually increases. During that time period, the bypass valve 191 is in a fully-open position and hence the compressor pressure does not rise.

When the number of revolutions of the compressor 172 reaches the revolution number B at time T2, the bypass valve 191 is fully closed from the fully-open state. Accordingly, the compressor pressure steeply rises up to an excessively supercharged state unlikely to occur during normal driving. This compressor pressure exceeds the breakage pressure needed to cause crack breakdown of the bead seal part 21*ab*. Thus, the bead seal part 21*ab* is crack-broken, to open the communication area (the clearance) between the valve element 14 and the bead seal part 21*ab* to provide communication between the upstream side and the downstream side in the passage 11. Thereafter, at time T3 and subsequent, the number of revolutions of the compressor 172 and the compressor pressure are constant, which allow stable escape running to be performed.

According to the fuel cell system in the present embodiment described in detail above, the number of revolutions of the compressor 172 is increased up to the revolution number B while the bypass valve 191 is in a fully-open state, and then the bypass valve 191 is fully closed to thereby create an excessively supercharged state, thus causing crack breakage of the bead seal part 21*ab* along the slit 22. This opens the communication area between the valve element 14 and the bead seal part 21*ab*. This makes it possible to supply air to the fuel cell stack 111, allowing more stable escape running to be performed.

The foregoing embodiments are mere examples and give no limitation to the present disclosure. This disclosure may be embodied in other specific forms without departing from the essential characteristics thereof. For instance, in the aforementioned embodiments, the rubber seat 21 is provided in the valve seat 13. Instead, this rubber seat 21 may be provided in the valve element 14. For both the inlet sealing valve 174 and the outlet integration valve 181, eccentric valves are used in the aforementioned embodiments. As an alternative, another electrical-operated opening and closing valve (e.g., a poppet valve) may also be used.

In the aforementioned fuel cell system, preferably, the controller is configured to open the upstream-side bypass valve at start-up of the system before opening the upstream-side valve and the downstream-side valve.

With the above configuration, the internal pressure of the fuel cell can be regulated to atmospheric pressure at start-up of the system. Thus, the upstream-side valve and the downstream-side valve can be opened while the surface pressure of the seal part of each of the upstream-side valve and the downstream-side valve with respect to one of the valve element and the valve seat is decreased. Accordingly, in each of the upstream-side valve and the downstream-side valve, it is possible to prevent sticking between the seal member and the valve element or the valve seat and wearing of the seal member.

The aforementioned fuel cell system may include: a downstream-side bypass passage connected to the oxidant gas exhaust passage be detouring around the downstream-side valve; and a downstream-side bypass valve in the downstream-side bypass passage.

Accordingly, even if the downstream-side valve fails to open due to a failure such as wire breaking, the downstream-side bypass valve can be opened. Therefore, this allows supply of oxidant gas to a fuel cell, i.e., can regulate the amount of supply of oxidant gas. Thus, stable escape running can be performed even if the downstream-side valve fails to open.

In the aforementioned, fuel cell system, preferably, when the upstream-side bypass valve is a solenoid valve, at start-up of the system, before opening the upstream-side valve and the downstream-side valve, the controller opens the solenoid valve from a valve-closed state and then closes the solenoid valve. Alternatively, preferably, when at least one of the upstream-side bypass valve and the downstream-side bypass valve is a solenoid valve, at start-up of the system, before opening the upstream-side valve and the downstream-side valve, the controller opens the solenoid valve from a valve-closed state and then closes the solenoid valve.

Accordingly, in a fuel cell system installing a solenoid valve as the upstream-side bypass valve or the downstream-side bypass valve, it is possible to prevent sticking or fixing of the solenoid valve due to long-term non-operation and also detect a failure of the solenoid valve.

Another aspect of the present disclosure provides a fuel cell system comprising: a fuel cell; an oxidant gas supply passage tor supplying oxidant gas to the fuel cell; a compressor provided in the oxidant gas supply passage and configured to supply the oxidant gas to the fuel cell; an upstream-side valve provided in the oxidant gas supply passage between the compressor and the fuel cell; an oxidant gas exhaust passage for exhausting the oxidant gas supplied to the fuel cell; a downstream-side valve provided in the oxidant gas exhaust passage; a bypass passage connected to the oxidant gas supply passage and the oxidant gas exhaust passage; a bypass valve provided in the bypass passage and configured to control a flow rate of the oxidant gas to be allowed to flow in the bypass passage; and a controller configured to execute various controls; wherein each of the upstream-side valve and the downstream-side valve includes: a valve seat including a valve hole and a seat surface formed at an edge of the valve hole; a valve element including an outer periphery formed with a seal surface corresponding to the seat surface; and a drive mechanism configured to move the valve element in a direction away from the valve seat by electric power supplied from outside, one of the valve seat and the valve element is provided with a seal member configured to seal between the valve element and the valve seat during non-operation of the drive mechanism, and the upstream-side valve includes a low pressure-resistant part having low resistance to pressure and being provided in a communication area between the valve element and the valve seat, through which an upstream side and a downstream side of the upstream-side valve can be communicated with each other during non-operation of the drive mechanism, and if the upstream-side valve is in closing failure, the controller increases number of revolutions of the compressor to increase pressure in the oxidant gas supply passage in order to deform or break the low pressure-resistant part to provide communication through the communication area.

In the aforementioned fuel cell system, the low pressure-resistant part having low resistance to pressure is provided in the communication area through which the upstream side and the downstream side of the upstream-side valve are allowed to communicate with each other during non-operation of a drive mechanism. If the upstream-side valve fails in a closed position, the controller increases the number of revolutions of the compressor to increase the internal pressure of the oxidant gas supply passage, thereby deforming or breaking the low pressure-resistant part to open the communication area, that is, to provide communication through the communication area. Accordingly, even if the upstream-side valve fails to open due to closing failure such as breaking of wire, supply of oxidant gas to a fuel cell can be performed through the communication area. This allows escape running even if the upstream-side valve becomes unstable to open. The communication area may be provided in the upstream-side valve itself or provided so as to detour around the upstream-side valve.

In the aforementioned, fuel cell system, preferably, the seal member of the upstream-side valve is provided with a bead seal part having a bead-like shape, the low pressure-resistant part is the bead seal part, and if the upstream-side valve is in closing failure, the controller increases the number of revolutions of the compressor to increase the pressure in the oxidant gas supply passage to deform the bead seal part to provide communication through the communication area between the valve element and the valve seat.

Since the seal part of the upstream-side valve is provided with the bead seal part, this bead seal part operates as the low pressure-resistant part. Specifically, when the number of revolutions of the compressor is increased to raise the internal pressure of the oxidant gas supply passage, the bead seal part is deformed. Deformation of this bead seal part allows communication through the communication area between the valve element and the valve seat. Consequently, even if the upstream-side valve fails to open due to closing failure such as breaking of wire, escape running can be performed without adding any new structure.

In the aforementioned, fuel cell system, if the upstream-side valve is in closing failure, the controller may increase the number of revolutions of the compressor while keeping the bypass valve in a valve-open state, and then fully closes the bypass valve to sharply increase the pressure in the oxidant gas supply passage to cause breakage of the low pressure-resistant part to provide communication through the communication area.

In the above manner, after the number of revolutions of the compressor is increased while the bypass valve is kept in a valve-open state, the bypass valve is fully closed to steeply raise the internal pressure of the oxidant gas supply passage. This can create an excessively supercharged state unlikely to occur during normal driving without increasing the size (the cost) of the compressor. Accordingly, the pressure resistance value of the low pressure-resistant part can be set higher, so that the low pressure-resistant part is broken or fractured only when the escape running is needed. Specifically, it is possible to reliably prevent breakage of the low pressure-resistant part caused when the pressure abnormally rises during normal driving. By breaking the low pressure-resistant part, the opening area (opening planar dimension) of the communication area can be made larger than in a case of deforming the low pressure-resistant part. This can increase an amount of oxidant gas to be supplied to the fuel cell. Accordingly, escape running can be more stably performed.

In the above case, preferably, the seal member of the upstream-side valve is provided with a bead seal part having a bead-like shape, the bead seal part includes an outer peripheral surface formed with a slit acting as the low pressure-resistant part, and if the upstream-side valve is in closing failure, the controller increases the number of revolutions of the compressor while keeping the bypass valve in a valve-open state, and then fully closes the bypass valve to sharply increase the pressure in the oxidant gas supply passage to cause crack breakdown of the bead seal part along the slit to provide communication through the communication area between the valve element and the valve seat.

With the aforementioned configuration, escape running can be more stably performed if the upstream-side valve fails to open due to closing failure such as breaking of wire, without adding new structure.

In the aforementioned, fuel cell system, preferably, the seal member of the downstream-side valve is provided with a lip seal part having a lip-like shape, and if the downstream-side valve is in closing failure, the controller increases the number of revolutions of the compressor to increase the pressure in the fuel cell to press the lip seal part to be expanded outwardly to provide communication through the communication area between the valve element and the valve seat.

With the aforementioned configuration, even if the downstream-side valve fails to open due to closing failure such as breaking of wire, allowing control of the amount of oxidant gas to be supplied to the fuel cell without adding any new structure. Thus, escape running can further stably performed.

REFERENCE SIGNS LIST

2 Valve section
3 Drive mechanism section
11 Flow passage
13 Valve seat 14 Valve element
15 Rotary shaft
21 Rubber seat
21a Seal part
21ab Bead seal part
21a1 Lip seal part
22 Slit
32 Motor
101 Fuel cell system
111 Fuel cell stack (Fuel cell)
113 Air system
161 Air supply passage
162 Air exhaust passage
163 Bypass passage
164 Inlet-side bypass passage
165 Outlet-side bypass passage
172 Compressor
174 Inlet sealing valve
181 Outlet integration valve
191 Bypass valve
192 Inlet bypass valve (Solenoid valve)
193 Outlet bypass passage (Solenoid valve)
201 Controller

What is claimed is:

1. A fuel cell system comprising:
a fuel cell;
an oxidant gas supply passage that supplies oxidant gas to the fuel cell;
a compressor provided in the oxidant gas supply passage and configured to supply the oxidant gas to the fuel cell;
an upstream-side valve provided in the oxidant gas supply passage between the compressor and the fuel cell, the upstream-side valve including:
 a valve seat including a valve hole and a seat surface formed at an edge of the valve hole,
 a valve element including an outer periphery formed with a seal surface corresponding to the seat surface, and
 a drive mechanism configured to move the valve element in a direction away from the valve seat by electric power supplied from outside, wherein one of the valve seat and the valve element is provided with a seal member configured to seal between the valve element and the valve seat during non-operation of the drive mechanism;
an oxidant gas exhaust passage that exhausts the oxidant gas supplied to the fuel cell;
a downstream-side valve provided in the oxidant gas exhaust passage, the downstream-side valve including:
 a valve seat including a valve hole and a seat surface formed at an edge of the valve hole,
 a valve element including an outer periphery formed with a seal surface corresponding to the seat surface, and
 a drive mechanism configured to move the valve element in a direction away from the valve seat by electric power supplied from outside, wherein one of the valve seat and the valve element is provided with a seal member configured to seal between the valve element and the valve seat during non-operation of the drive mechanism;
a bypass passage connected to the oxidant gas supply passage and the oxidant gas exhaust passage;
a bypass valve provided in the bypass passage and configured to control a flow rate of the oxidant gas to be allowed to flow in the bypass passage;
a controller configured to execute various controls;
an upstream-side bypass passage connected to the oxidant gas supply passage by detouring around the upstream-side valve; and
an upstream-side bypass valve in the upstream-side bypass passage,
 wherein the upstream-side bypass valve is a safety valve configured to rupture when a differential pressure between an upstream side and a downstream side of the upstream-side bypass valve in the upstream-side bypass passage is equal to or greater than a first predetermined pressure.

2. The fuel cell system according to claim 1, wherein the controller is configured to open the upstream-side bypass valve at start-up of the fuel cell system before opening the upstream-side valve and the downstream-side valve.

3. The fuel cell system according to claim 1, further comprising:
a downstream-side bypass passage connected to the oxidant gas exhaust passage by detouring around the downstream-side valve; and
a downstream-side bypass valve in the downstream-side bypass passage.

4. The fuel cell system according to claim 1, wherein when the upstream-side bypass valve is a solenoid valve, at start-up of the fuel cell system, before opening the upstream-side valve and the downstream-side valve, the controller opens the solenoid valve from a valve-closed state and then closes the solenoid valve.

5. The fuel cell system according to claim 3, wherein when at least one of the upstream-side bypass valve and the downstream-side bypass valve is a solenoid valve, at start-up of the fuel cell system, before opening the upstream-side valve and the downstream-side valve, the controller opens the solenoid valve from a valve-closed state and then closes the solenoid valve.

6. The fuel cell system according to claim 3, wherein the downstream-side bypass valve is a safety valve configured to rupture when a differential pressure between an upstream side and a downstream side of the downstream-side bypass valve in the downstream-side bypass passage is equal to or greater than a second predetermined pressure.

7. A fuel cell system comprising:
a fuel cell;
an oxidant gas supply passage that supplies oxidant gas to the fuel cell;
a compressor provided in the oxidant gas supply passage and configured to supply the oxidant gas to the fuel cell;
an upstream-side valve provided in the oxidant gas supply passage between the compressor and the fuel cell, the upstream-side valve including:
 a valve seat including a valve hole and a seat surface formed at an edge of the valve hole,
 a valve element including an outer periphery formed with a seal surface corresponding to the seat surface, and
 a drive mechanism configured to move the valve element in a direction away from the valve seat by electric power supplied from outside, wherein one of the valve seat and the valve element is provided with a seal member configured to seal between the valve element and the valve seat during non-operation of the drive mechanism;
an oxidant gas exhaust passage that exhausts the oxidant gas supplied to the fuel cell;
a downstream-side valve provided in the oxidant gas exhaust passage, the downstream-side valve including:

a valve seat including a valve hole and a seat surface formed at an edge of the valve hole, a valve element including an outer periphery formed with a seal surface corresponding to the seat surface, and a drive mechanism configured to move the valve element in a direction away from the valve seat by electric power supplied from outside, wherein one of the valve seat and the valve element is provided with a seal member configured to seal between the valve element and the valve seat during non-operation of the drive mechanism;

a bypass passage connected to the oxidant gas supply passage and the oxidant gas exhaust passage;

a bypass valve provided in the bypass passage and configured to control a flow rate of the oxidant gas to be allowed to flow in the bypass passage;

a controller configured to execute various controls;

an upstream-side bypass passage connected to the oxidant gas supply passage by detouring around the upstream-side valve; and an upstream-side bypass valve placed in the upstream-side bypass passage at a higher position than the upstream-side valve.

8. A fuel cell system comprising:

a fuel cell;

an oxidant gas supply passage that supplies oxidant gas to the fuel cell;

a compressor provided in the oxidant gas supply passage and configured to supply the oxidant gas to the fuel cell;

an upstream-side valve provided in the oxidant gas supply passage between the compressor and the fuel cell, the upstream-side valve including:

a valve seat including a valve hole and a seat surface formed at an edge of the valve hole, a valve element including an outer periphery formed with a seal surface corresponding to the seat surface, and a drive mechanism configured to move the valve element in a direction away from the valve seat by electric power supplied from outside, wherein one of the valve seat and the valve element is provided with a seal member configured to seal between the valve element and the valve seat during non-operation of the drive mechanism;

an oxidant gas exhaust passage that exhausts the oxidant gas supplied to the fuel cell;

a downstream-side valve provided in the oxidant gas exhaust passage, the downstream-side valve including:

a valve seat including a valve hole and a seat surface formed at an edge of the valve hole, a valve element including an outer periphery formed with a seal surface corresponding to the seat surface, and a drive mechanism configured to move the valve element in a direction away from the valve seat by electric power supplied from outside, wherein one of the valve seat and the valve element is provided with a seal member configured to seal between the valve element and the valve seat during non-operation of the drive mechanism;

a bypass passage connected to the oxidant gas supply passage and the oxidant gas exhaust passage;

a bypass valve provided in the bypass passage and configured to control a flow rate of the oxidant gas to be allowed to flow in the bypass passage;

a controller configured to execute various controls;

an upstream-side bypass passage connected to the oxidant gas supply passage by detouring around the upstream-side valve; and an upstream-side bypass valve in the upstream-side bypass passage, the upstream-side bypass valve being configured to open when the upstream-side valve fails to open to allow supply of oxidant gas to the fuel cell.

* * * * *